US009185198B2

(12) United States Patent
Miyazaki et al.

(10) Patent No.: US 9,185,198 B2
(45) Date of Patent: Nov. 10, 2015

(54) MOBILE INFORMATION DEVICE, CONTROL METHOD, AND PROGRAM

(75) Inventors: Kazuto Miyazaki, Daito (JP); Ichiro Kajitani, Fukushima (JP)

(73) Assignee: KYOCERA Corporation, Kyoto (JP)

( * ) Notice: Subject to any disclaimer, the term of this patent is extended or adjusted under 35 U.S.C. 154(b) by 315 days.

(21) Appl. No.: 13/818,618

(22) PCT Filed: Aug. 25, 2011

(86) PCT No.: PCT/JP2011/004729
§ 371 (c)(1),
(2), (4) Date: Feb. 22, 2013

(87) PCT Pub. No.: WO2012/026125
PCT Pub. Date: Mar. 1, 2012

(65) Prior Publication Data
US 2013/0157726 A1 Jun. 20, 2013

(30) Foreign Application Priority Data

Aug. 25, 2010 (JP) ................................. 2010-188214

(51) Int. Cl.
*H04M 1/247* (2006.01)
*G06F 1/32* (2006.01)
*G06F 3/044* (2006.01)
*H04M 1/23* (2006.01)

(52) U.S. Cl.
CPC .............. *H04M 1/247* (2013.01); *G06F 1/3231* (2013.01); *G06F 3/044* (2013.01); *H04M 1/23* (2013.01); *H04M 2250/12* (2013.01); *Y02B 60/1289* (2013.01)

(58) Field of Classification Search
USPC ................ 455/550.1, 566, 567, 575.1, 575.3, 455/575.4; 345/169–173
See application file for complete search history.

(56) References Cited

U.S. PATENT DOCUMENTS

| 6,342,738 B1 * | 1/2002 | Lutnaes .................... 307/575.1 |
| 2002/0030668 A1 | 3/2002 | Hoshino et al. |
| 2005/0003793 A1 * | 1/2005 | Goris et al. .................. 45/575.1 |

(Continued)

FOREIGN PATENT DOCUMENTS

| JP | 2002-062983 A | 2/2002 |
| JP | 2004-159028 A | 6/2004 |
| JP | 2005-269567 A | 9/2005 |
| JP | 2006-004061 A | 1/2006 |

(Continued)

OTHER PUBLICATIONS

International Search Report issued by Japanese Patent Office for International Application No. PCT/JP2011/004729, Sep. 2011.

*Primary Examiner* — Thanh Le
(74) *Attorney, Agent, or Firm* — Procopio, Cory, Hargreaves & Savitch, LLP

(57) ABSTRACT

Provided is a mobile information device which can prevent erroneous inputs in situations where conventional mobile information devices cannot prevent erroneous inputs. Two proximity sensors 110 are provided on a front surface 102 of a mobile information device 100. The two proximity sensors 110 are separated from one another by a distance equivalent to at least one key 105, and are each adjacent to at least one of the keys 105. The mobile information device 100 blocks execution of processing in response to key operations when both of the proximity sensors 110 detect a state of proximity of a sensing target, such as a human body. As a result, erroneous inputs on the keys 105 caused by contact with hands or face can be prevented.

10 Claims, 12 Drawing Sheets

(56) References Cited

U.S. PATENT DOCUMENTS

| | | |
|---|---|---|
| 2006/0082549 A1 | 4/2006 | Hoshino et al. |
| 2009/0160802 A1 | 6/2009 | Yasumi |
| 2010/0164871 A1 | 7/2010 | Shigeta et al. |
| 2011/0059776 A1* | 3/2011 | Seo et al. .................. 455/566 |

FOREIGN PATENT DOCUMENTS

| | | |
|---|---|---|
| JP | 2008-046971 A | 2/2008 |
| JP | 2008-052586 A | 3/2008 |
| JP | 2009-153072 A | 7/2009 |

\* cited by examiner

MOBILE INFORMATION DEVICE, CONTROL METHOD, AND PROGRAM

TECHNICAL FIELD

The present invention relates to mobile information devices such as cellular telephones.

BACKGROUND ART

Keys are positioned on a mobile information device, such as a cellular telephone, in order that a user can select functions and input text such as numbers and letters. The user can perform an operation by pressing one of the keys using a finger, thus causing the mobile information device to execute processing of a desired function or input.

Recent years have seen an appearance of mobile information devices that are operable by small amounts of force, or even just by touch, through configurations such as where the keys are capacitive touch sensors. Although mobile information devices of the type described above have an advantage of touch operations being easy to perform, a problem is that erroneous inputs that are not intended by the user also easily occur.

Patent Literature 1 recites a mobile information device that prevents unintended touch operations (erroneous inputs) occurring when a face of a user makes contact with touch sensor type keys during a telephone call. Erroneous inputs are prevented by positioning a touch sensor adjacent to a receiver of the mobile information device so that, when an ear of the user contacts with the touch sensor, input via the keys is disabled.

CITATION LIST

Patent Literature

[Patent Literature 1]
Japanese Patent Application Publication No. 2005-269567

Summary of Invention

Technical Problem

However, as explained below, a configuration only having a touch sensor positioned adjacent to the receiver (below referred to as an "ear sensor") does not sufficiently prevent erroneous inputs.

The art recited in Patent Literature 1 cannot prevent erroneous inputs from occurring in situations other than during telephone calls. For example, it is difficult for the above art to prevent erroneous inputs occurring if there is contact through clothing between a body part of a user (for example a chest or a thigh) and the keys while the mobile information device is stored unused in a pocket. Furthermore, it is difficult for the art recited in Patent Literature 1 to prevent erroneous inputs occurring when commencing a telephone call if the face of the user contacts with the keys, before the ear contacts with the ear sensor. The above situation may occur if the user bumps into a person or an object while moving the mobile information device toward the ear.

As described above, the conventional art is limited to preventing erroneous inputs that occur during telephone calls while the mobile information device is in contact with the ear of the user.

In view of the above problem, the present invention aims to provide a mobile information device that is able to prevent erroneous inputs even in situations where a conventional mobile information device cannot prevent erroneous inputs.

Solution to Problem

In order to solve the above problem, a mobile information device relating to the present invention comprises: a housing; a plurality of keys disposed on one surface of the housing; a control unit configured to execute processing in response to a touch operation performed on at least one of the keys; and N proximity sensors (N ≥2) disposed on the surface of the housing, and each configured to detect a proximity state of a sensing target, wherein when at least two predetermined proximity sensors among the N proximity sensors detect the proximity state, the control unit blocks the processing in response to the touch operation on the at least one of the keys.

Advantageous Effects of Invention

The mobile information device relating to the present invention is able to prevent erroneous inputs even in situations where a conventional mobile information device cannot prevent erroneous inputs.

DESCRIPTION OF EMBODIMENTS

An embodiment of the present invention is explained below with reference to the drawings.

Figure 1:
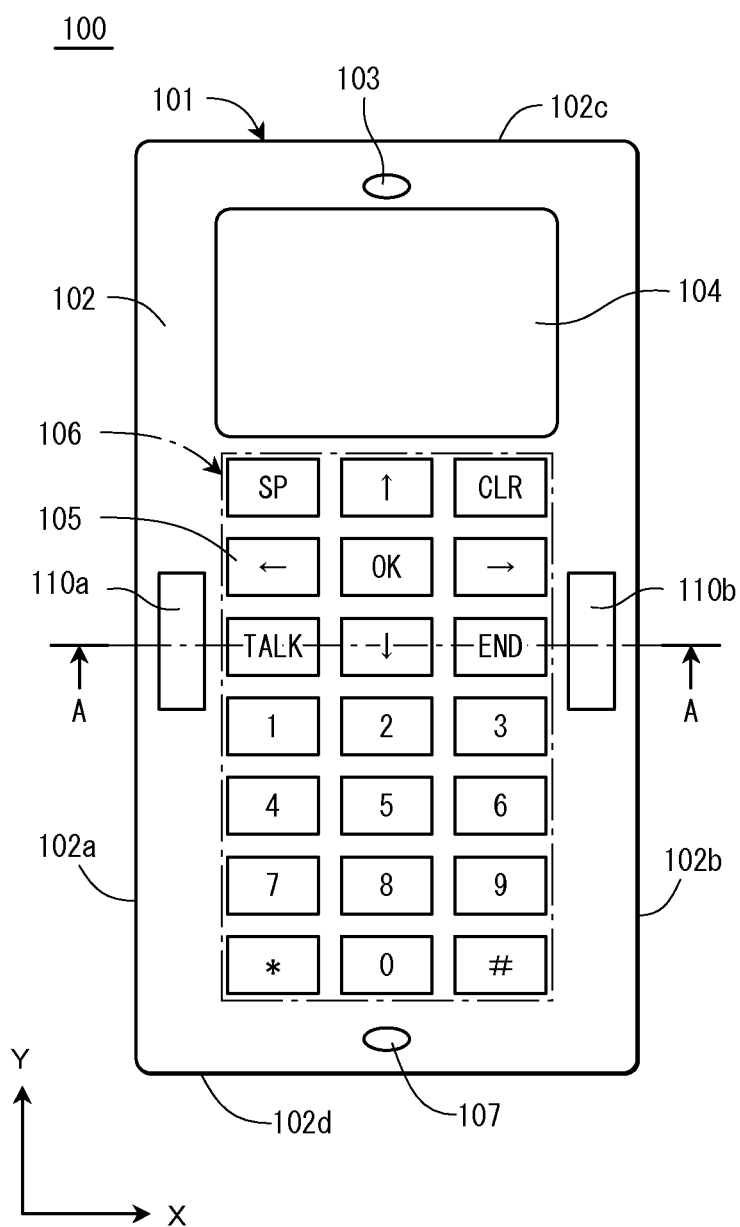
FIG. 1 is a planar schematic view of an external configuration of a mobile information device 100 relating to an embodiment of the present invention.

[Embodiment]
<1. Mobile Information Device Configuration>
[1.1] External Configuration
FIG. 1 is a planar schematic view of the external configuration of a mobile information device 100 relating to the present embodiment.

The mobile information device 100 relating to the present embodiment is configured as a bar-type cellular telephone. The mobile information device 100 includes a housing 101 that is a cuboid with flat surfaces. The housing 101 is long in a longitudinal direction (y-axis direction) and short in a width direction (x-axis direction). The housing 101 has a front surface 102 that is a main surface of the mobile information device 100. The front surface 102 has a rectangular shape which is long in the longitudinal direction and short in the width direction. The front surface 102 has two longitudinal sides 102a and 102b in the longitudinal direction (left side 102a and right side 102b). The front surface 102 also has two short sides 102c and 102d in the width direction (top side 102c and bottom side 102d).

The mobile information device 100 further includes a receiver 103 that outputs telephone call audio, a display unit 104, an operation block 106 including a plurality of keys 105 arranged in a matrix, and a microphone, that are disposed on the front surface 102 of the housing 101 in respective order in the longitudinal direction.

Each of the keys 105 is a capacitive touch sensor with a quadrilateral shape in planar view. The keys 105 are explained later in more detail.

The operation block 106 is configured as a key group formed from the keys 105. The external appearance of the operation block 106 is a rectangle which is long in the longitudinal direction, with the keys 105 arranged in a matrix.

The mobile information device 100 includes two proximity sensors 110 each configured to detect a proximity state when a sensing target, such as a human body, is in proximity. Each proximity sensor 110 is configured as a capacitive sensor including an electrode that is quadrilateral in shape in planar view. Sensing targets for the proximity sensors 110 at least include the human body. In response to approach or separation of the sensing target in a direction perpendicular to the front surface 102, each of the proximity sensors 110 changes a detection value. As explained later, although the proximity sensors 110 and the keys 105 have different planar shapes, the proximity sensors 110 and the keys 105 are identical in structure (refer to FIG. 3).

The proximity sensors 110 are centered in the longitudinal direction on the front surface 102 of the housing 101. In the width direction, the proximity sensors 110 are adjacent to the operation block 106, and sandwich the operation block 106 therebetween. In the above configuration three keys 105 arranged in a row in the operation block 106 are sandwiched between the two proximity sensors 110 in the width direction. The proximity sensors 110 being centered in the longitudinal direction means that if for example, the front surface 102 is partitioned in the longitudinal direction into three sections of equal size, the proximity sensors 110 are in a central section among the three sections.

In planar view, the electrode of each of the proximity sensors 110 is a rectangle which is long in the longitudinal direction. The electrode of each of the proximity sensors 110 is at least twice as long in the longitudinal direction as each of the keys 105. Each of the proximity sensors 110 is shorter in the width direction than each of the keys 105.

Separation between each proximity sensor 110 and the keys 105 is smaller than length in the width direction of each of the keys 105. In other words, each of the proximity sensors 110 is adjacent to at least one of keys 105.

[1.2] Internal Configuration

Figure 2:
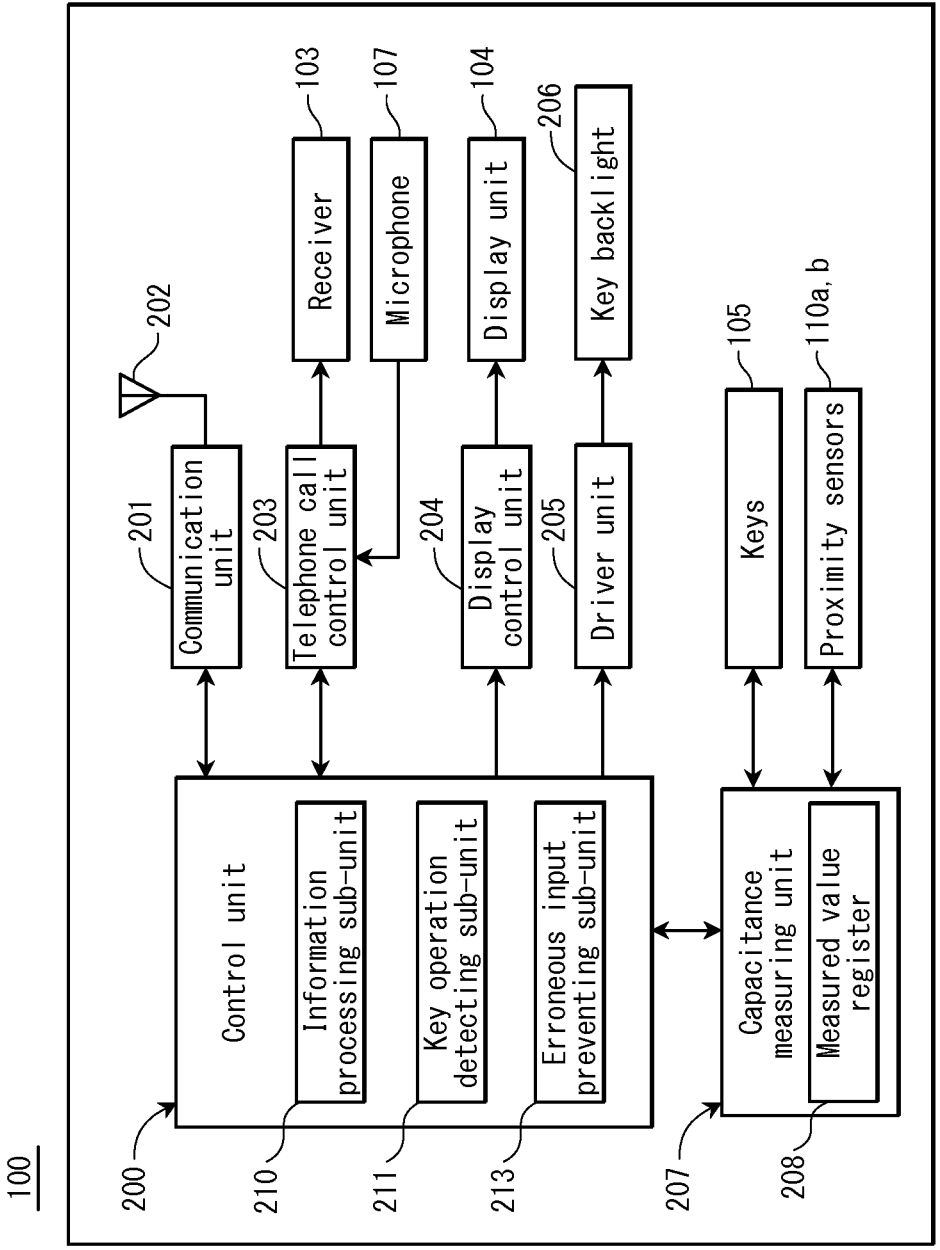
FIG. 2 is a block diagram showing an internal configuration of the mobile information device 100.

FIG. 2 is a schematic diagram showing the internal configuration of the mobile information device 100.

Further to the configuration shown in FIG. 1, the mobile information device 100 includes a control unit 200, and a communication unit 201, a telephone call control unit 203, and a display control unit 204 which are each connected to the control unit 200.

The control unit 200 includes a computer provided with a CPU (Central Processing Unit), a memory, a bus, and an I/O interface. Through execution by the CPU of programs stored in the memory, the control unit 200 controls various functions, such as a communication function for a cellular phone.

The communication unit 201 performs transmission and reception of electric waves with a base station through an antenna 202. The telephone call control unit 203 D/A converts audio signals sent from the control unit 200, and outputs audio from the receiver 103. The telephone call control unit 203 A/D converts audio input into a microphone 107, and sends the converted audio to the control unit 200.

The display control unit 204 controls the display unit 104, causing the display unit 104 to display images sent from the control unit 200. The display unit 104 includes a liquid crystal panel and a backlight. The liquid crystal panel and the backlight are also controlled by the display control unit 204.

The mobile information device 100 further includes a drive unit 205 connected to the control unit 200, and a key backlight 206 that illuminates the keys 105 from behind. The key backlight 206 is connected to the drive unit 205, and in response to instructions from the control unit 200, the drive unit 205 switches power supply to the key backlight 206 between On and Off.

The mobile information device 100 further includes a capacitance measuring unit 207 that is connected to the control unit 200. The capacitance measuring unit 207 is also connected to each of the keys 105 and each of the proximity sensors 110. The capacitance measuring unit 207 is configured as an IC (Integrated Circuit) that supplies a pulse to each of the keys 105 and each of the proximity sensors 110 in order, measuring a capacitance thereof. The capacitance measuring unit 207 includes a measured value register 208 where the capacitance measuring unit 207 stores each of the capacitance measured values.

[1.3] Keys 105 and Proximity Sensors 110

Figure 3:
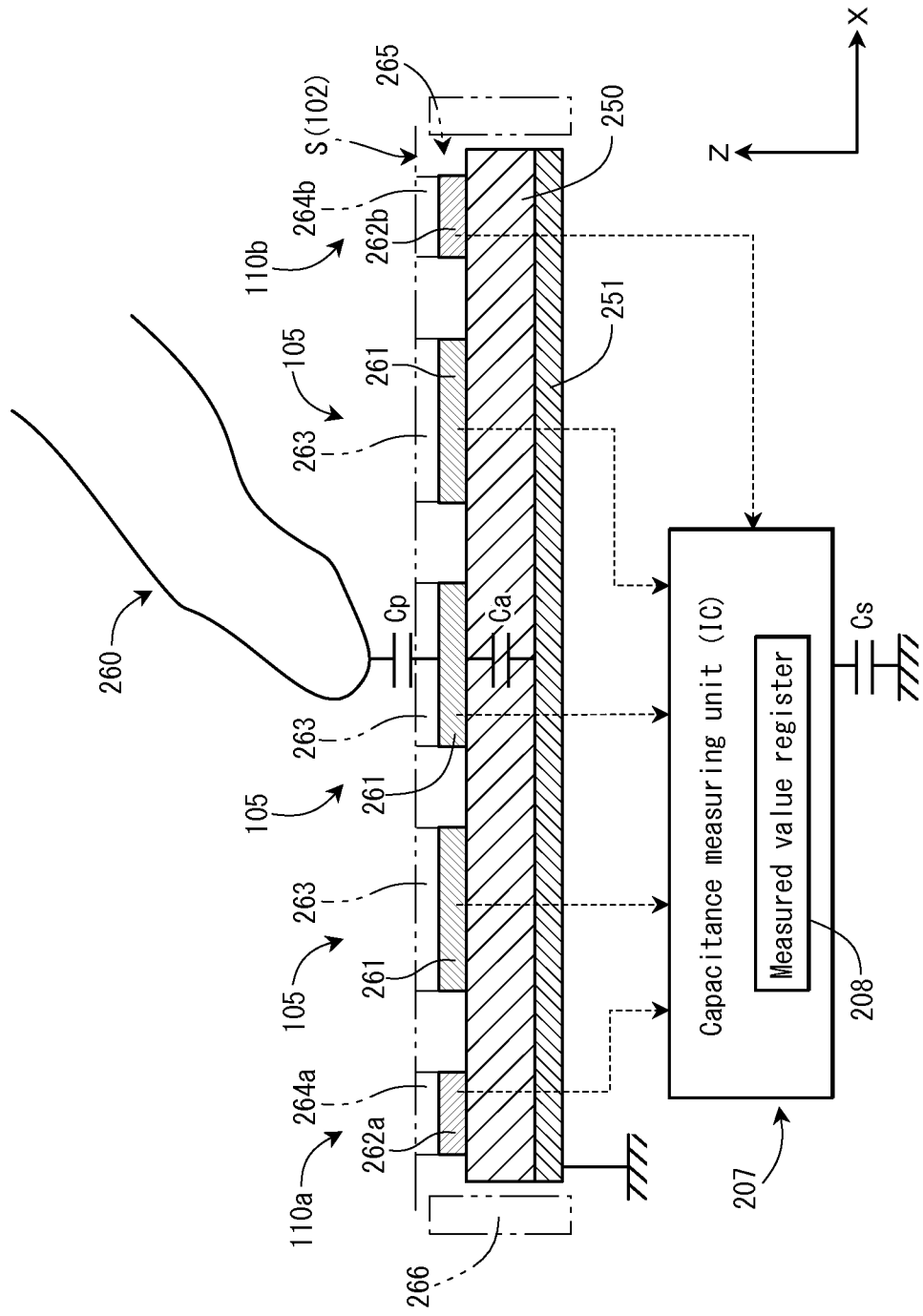
FIG. 3 is a cross-sectional view showing keys 105 and proximity sensors 110 of the mobile information device 100.

FIG. 3 is a cross-sectional view of the keys 105 and the proximity sensors 110 along a line A-A shown in FIG. 1. The keys 105 and the proximity sensors 110 each have a configuration where an electrode 261 and 262 respectively is disposed on a board 250, which is insulating, and each of the electrodes 261 and 262 is covered by a cover unit 263 and 264 respectively, which is also insulating.

The electrodes 261, 262 are separated from one another other and there is no electrical conduction between any of the electrodes 261, 262. Each of the electrodes 261, 262 is configured as a conducting film that in planar view is quadrilateral in shape.

A protective film 265, which is insulating, is formed on an upper surface of the board 250 (a main surface closest to the front surface 102), covering the keys 105 and the proximity sensors 110. A surface of the protective film 265 is shown by a two dot chain line labeled by reference sign S. Each of the cover units 263, 264 is formed by part of the protective film 265. On the cover units 263 of the keys 105 there are markings, such as numbers, symbols and lines, showing letters, numbers and functions corresponding to each of keys 105, and positions of the keys 105.

The board 250 is a layered board including a wired layer which for simplification is omitted in FIG. 3. The keys 105 and the proximity sensors 110 are connected to the capacitance measuring unit 207 through the wired layer. A conducting film 251 is formed on a rear side of the board 250. The conducting film 251 is connected to ground potential (GND).

A side plate 266, formed from a conducting material, is provided around the board 250, and the side plate 266 is also connected to ground potential.

In the present embodiment each of the electrodes 261 is equal in size to each of the keys 105.

<2. Operation>

[2.1] Outline of Processing Relating to Key Operations and Erroneous Input Prevention In the present embodiment, when a touch operation is performed on any one of the keys 105 (a key operation), the control unit 200 executes processing of a function corresponding to the key operation, for example commencing a telephone call. However, if a proximity state of a sensing target, such as a human body, is detected by the two proximity sensors 110a, b, execution of processing in response to key operations (referred to below as operation response processing) is blocked. In other words, erroneous inputs are prevented by locking key operations. A state where key operations are locked is referred to below as "operation lock mode".

Figure 4:
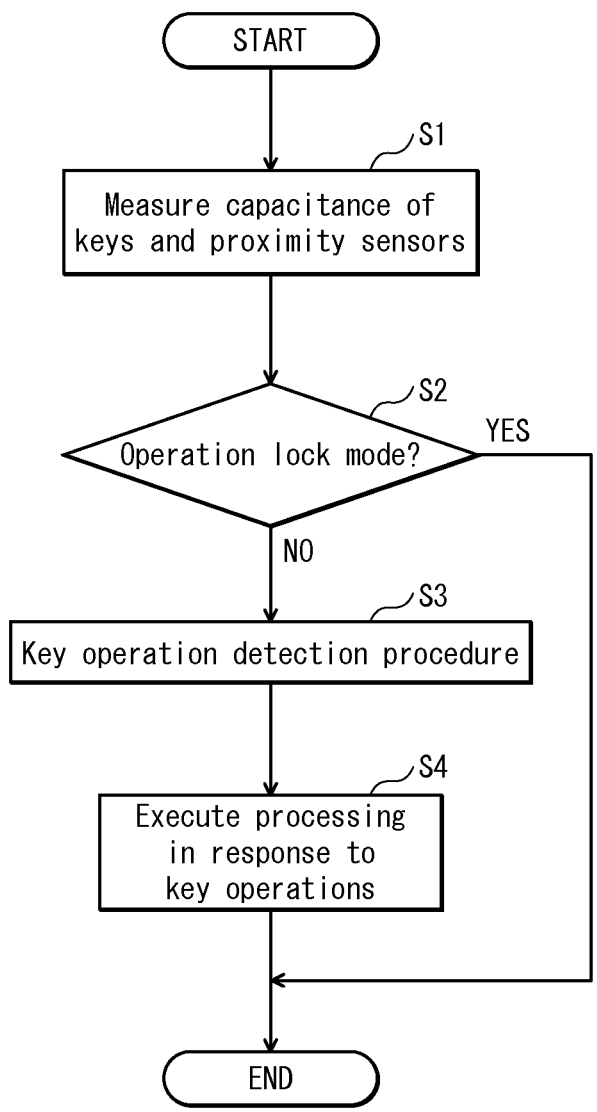
FIG. 4 is a flowchart outlining processing relating to key operations in the mobile information device 100.

FIG. 4 is a flowchart outlining an erroneous input prevention procedure.

[2.1.1] Key Scan Procedure

In Step S1 a key scan procedure is performed by the capacitance measuring unit 207. The key scan procedure is performed by measuring a capacitance of each of the keys 105 and each of the proximity sensors 110. In the present embodiment the keys 105 and the proximity sensors 110 have the same structure.

Measurement of the capacitance by the capacitance measuring unit 207 is explained below.

As shown in FIG. 3, a capacitance Ca is present between the conducting membrane 251 and each of the keys 105 (and each of the proximity sensors 110). When a finger 260 of the user approaches one of the keys 105 (or one of the proximity sensors 110) a coupled capacitance Cp arises between the finger 260 and the key 105. The value of the coupled capacitance Cp increases as distance between the finger 250 and the key 105 decreases. Therefore, based on coupled capacitance Cp values it is possible to judge whether a finger contacts with one of the keys 105, or in the case of the proximity sensors 110, whether a face or palm is in proximity.

Assume a situation such as shown in FIG. 3 where the finger 260 of the user performs a touch operation on one of the keys 105.

The capacitance measuring unit 207 supplies a rectangular pulse to the key 105 and measures a delay T until voltage rises to a set voltage. When no sensing target is present in proximity to the key 105, the delay T is a time Ta related to magnitude of the capacitance Ca. In contrast, when a sensing target, the finger 260, is in proximity to the key 105, the delay T is a time Tp related to magnitude of a total capacitance (Ca+Cp) of the capacitance Ca and the coupled capacitance Cp. The coupled capacitance Cp causes a reduction in speed at which the voltage rises, so consequently the time Tp is greater than the time Ta.

It is explained later how based on the delay T it is possible to determine whether the sensing target, such as the human body, is in proximity or contact.

Measurement of the delay T is performed in order for each of the keys 105 and each of the proximity sensors 110. Measured values of the delay T are stored in the measured value register 208. An ID code is allotted to each of the keys 105 and each of the proximity sensors 110, and each of the measured values of the delay T is stored together with the ID code of a corresponding key 105 or proximity sensor 110.

Measurement of the delay T for each of the keys 105 and each of the proximity sensors 110 is repeated at a set time interval. When a new delay T is measured, the measured value of the delay T stored in the measured value register 208 is updated.

The measured value of the delay T is not an absolute value for the capacitance, but does indicate magnitude of the capacitance. Therefore, the measured value of the delay T is referred to below as a "capacitance measured value", and the capacitance measured value of each of the keys 105 indicates magnitude of a distance between the key 105 and the sensing target, such as the human body.

[2.1.2] Operation Lock Mode Determination

In Step S2 a key operation detecting sub-unit 211 determines whether the mobile information device 100 has been set in operation lock mode by an erroneous input preventing sub-unit 213. The above determination is performed based on an operation lock flag that shows whether the mobile information device 100 is in operation lock mode.

When in operation lock mode (operation lock flag: On, determination: Yes), a key operation detection procedure in Step S3 is not performed, and as a consequence execution of operation response processing is blocked. When in operation active mode, in other words when not in operation lock mode (operation lock flag: Off, determination: No), procedures from Step S3 onward are performed.

The erroneous input preventing sub-unit 213 obtains the capacitance measured values of the proximity sensors 110a, b, stored in the measured value register 208 of the capacitance measuring unit 207. Based on the obtained capacitance measured values, the erroneous input preventing sub-unit 213 switches the operation flag between On and Off, thus switching between operation lock mode and operation active mode. Procedures relating to the erroneous input preventing sub-unit 213 are explained later in detail with reference to the flowchart in FIG. 5.

[2.1.3] Key Operation Detection Procedure

When in operation active mode, the key operation detection procedure in Step S3 is performed by the key operation detecting sub-unit 211.

In the key operation detection procedure, the key operation detecting sub-unit 211 obtains the capacitance measured value (measured value of the delay T) stored in the measured value register 208 for each of the keys 105. The key operation detecting sub-unit 211 judges, based on the capacitance measured values, whether a key operation has been performed. A time interval between successive performances of the key operation detection procedure is greater than the time interval between successive performances of the key scan procedure in Step S1 (for example 2-4 times greater). Consequently, the capacitance measured values stored in the measured value register 208 are updated between successive performances of the key operation detection procedure.

A threshold value for key operation detection is used to judge whether a key operation has been performed. The threshold value for key operation detection is set as the capacitance measured value when the finger 260 is in surface contact with the surface S of any one of the keys 105.

When the capacitance measured value is at least equal to the threshold value for key operation detection, a key operation is judged to have been performed. When the capacitance measured value is less than the threshold value for key operation detection, it is judged that no key operation has been performed. When the capacitance measured value of two or more keys 105 is at least equal to the threshold value for key operation, it is judged that a key operation has been performed on whichever of the two or more keys 105 has a largest capacitance measured value.

When a key operation on one of the keys 105 is detected, the key operation detecting sub-unit 211 sends an ID code (referred to below as a key code) corresponding to the key 105 to an information processing sub-unit 210.

After sending the key code to the information processing sub-unit 210, a single performance of the key operation detection procedure is complete. When a key operation is not detected, the key operation detection procedure is complete without sending a key code to the information processing sub-unit 210.

A standard capacitor having a standard capacitance Cs is connected to the capacitance measuring unit 207. The capacitance measuring unit 207 supplies a pulse to the standard capacitor and measures a standard delay Ts that is related to the standard capacitance Cs. Based on the standard delay Ts, the threshold value for key operation detection is revised to an appropriate value. A capacitor for use in electric circuits is used for the standard capacitor, the capacitor being a ceramic capacitor having a capacitance equal to each of the keys 105 or each of the proximity sensors 110. The standard capacitor may also be formed by layering another board on the rear side of the board 250, and disposing an electrode with a surface area equal to each of the keys 105 or each of the proximity sensors 110 on the other board.

The threshold value for key operation detection may alternatively be set individually for each of the keys 105.

[2.1.4] Operation Response Processing

In Step S4, processing is executed by the information processing sub-unit 210 in response to the key code sent by the key operation detecting sub-unit 211 (referred to below as operation response processing). The operation response processing varies depending on which program is being executed by the information processing sub-unit 210 (for example a program for a telephone call function or a program for a mail function). When the program for the telephone call function is being executed for example, in response to operation of a number key, processing to input a dialing number may be performed and in response to operation of a connect key ("TALK" key 105 in FIG. 1), processing to commence a telephone call may be performed. When the program for the mailing function is being executed, in response to operation of one of the keys 105 processing to select a letter corresponding to the key 105 may be performed.

The above described operations of commencing phone calls and inputting letters may be allotted to each of the keys 105 as "key events". In this type of situation, operation response processing may be thought of as processing for executing the key events corresponding to each of the keys 105.

[2.1.5] Summary

As explained above, in Step S2 when the mobile information device 100 is in operation lock mode, key operations are not detected, and as a result execution of operation response processing is blocked, thus preventing erroneous inputs.

The flowchart in FIG. 4 only shows a general outline of procedures and it is not necessarily the case that all of the steps are performed in synchronization.

[2.2] Erroneous Input Prevention Procedure

Below the erroneous input prevention procedure is explained in detail.

Figure 5:
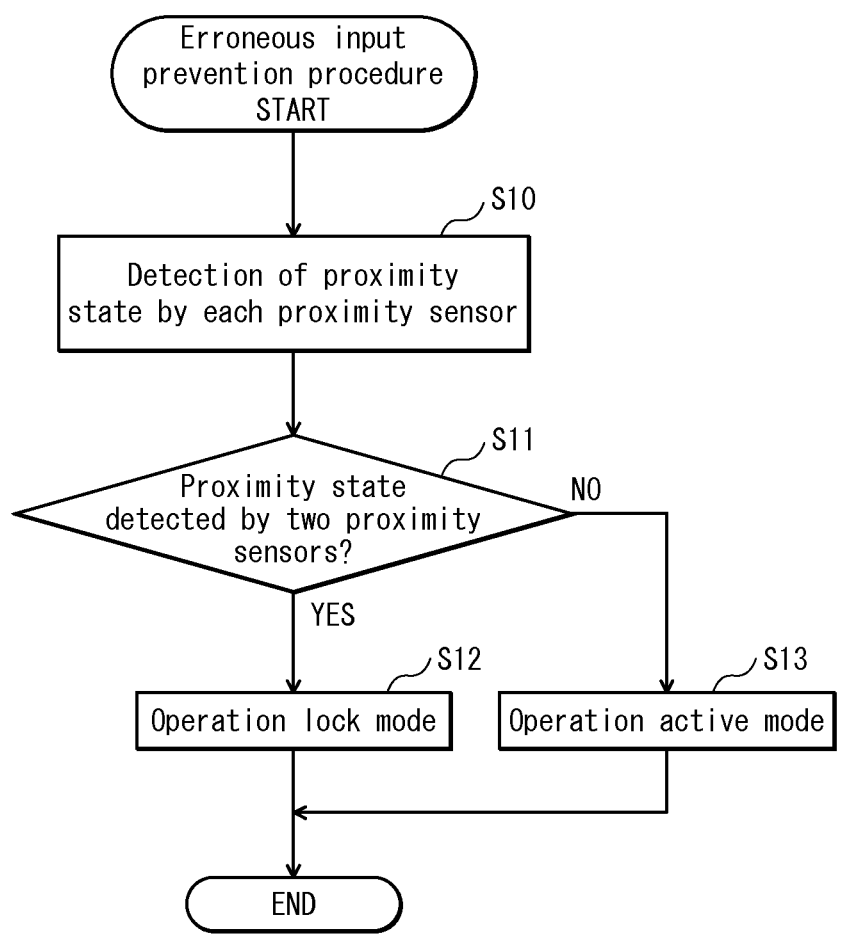
FIG. 5 is a flowchart showing an erroneous input prevention procedure in the mobile information device 100.

FIG. 5 is a flowchart showing the erroneous input prevention procedure performed by the erroneous input preventing sub-unit 213. The erroneous input prevention procedure is performed by execution of an erroneous input prevention program by the control unit 200 (the same also applies to erroneous input prevention procedures 2 and 3 explained later).

[2.2.1] Proximity State Determination

In Step S10, for each of the proximity sensors 110 it is determined whether a sensing target, such as a human body, is in proximity. More specifically, the capacitance measured value of each of the proximity sensors 110a, b is obtained from the measured value register 208 of the capacitance measuring unit 207, and the capacitance measured value is compared with a threshold value for proximity state detection. When the capacitance measured value is at least equal to the threshold value for proximity state detection the sensing target is determined in be in the proximity state, and when the capacitance measured value is less than the threshold value for proximity state detection, the sensing target is determined not to be in the proximity state.

[2.2.1a] Supplementary Explanation of the Threshold Value for Key Operation Detection Below is a supplementary explanation of the threshold value for key operation detection.

Figure 6:
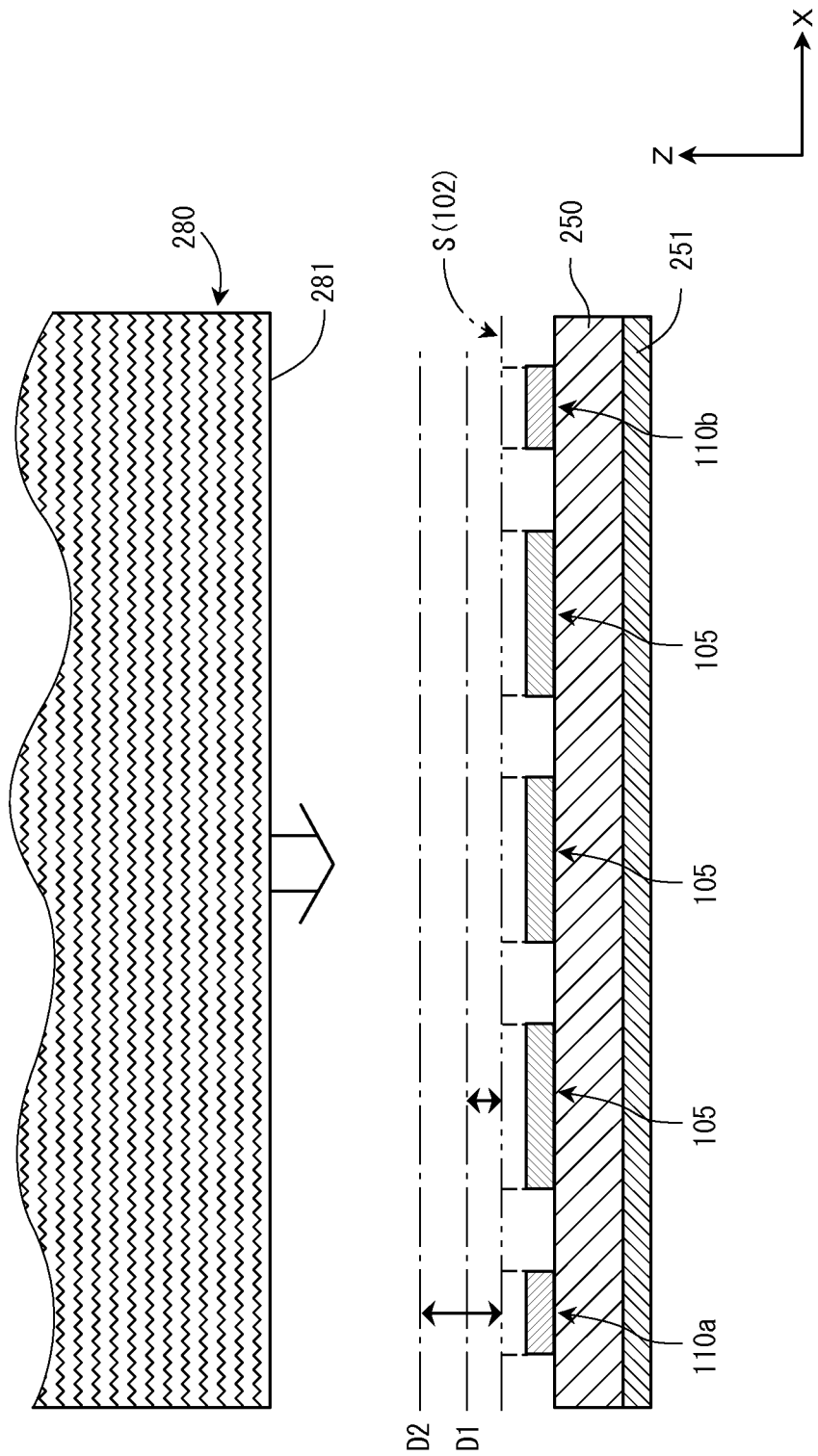
FIG. 6 is a schematic diagram showing detection distances of the keys 105 and the proximity sensors 110.

FIG. 6 is a schematic diagram showing a flat opposing surface 281 of a sensing target 280 in proximity to the front surface 102 of the mobile information device 100. The opposing surface 281 is parallel to the front surface 102. The sensing target 280 is assumed to be a human body, however the sensing target may alternatively be a metal or other conductor.

As explained above, the threshold value for key operation detection is set as the capacitance measured value when the finger 260 is in surface contact with any one of the keys 105. When the finger 260 and the key 105 are in surface contact, a contact surface area between the finger 260 and the key 105 may for example be of the scale of ⅓ of surface area of the key 105.

In general capacitance is proportional to surface area of an opposing electrode. Therefore, when the threshold value for key operation detection is of the scale described above, if a sensing target with a larger surface area than the finger 260, for example a palm or a face, is in proximity to the key 105, the capacitance measured value may be at least equal to the threshold value for key operation detection before the sensing target is in surface contact with the key 105.

Consequently, in the situation shown in FIG. 6, a key operation may be detected when the opposing surface 281 of the sensing target 280 is separated from the surface of the protective film S by no greater than a detection distance D1. When as shown in FIG. 6 the sensing target 280 is in a position opposing an upper surface of one of the keys 105 (electrode 261) entirely, the detection distance D1, which is a maximum distance at which the sensing target is detected, is small but greater than zero.

As a consequence of the above, when the mobile information device 100 is stored in a pocket, a key operation may be detected if the body is in contact with one of the keys 105 through clothing, thus causing an erroneous input.

[2.2.1b] Threshold Value for Proximity State Detection

The threshold value for proximity state detection is set as the capacitance measured value when the opposing surface 281 and the surface of the protective film S are separated by a detection distance D2 that is greater than the detection distance D1. Through setting of the detection distance D2 to a greater value than the detection distance D1, when the sensing target 280 approaches the protective film S the proximity state of the sensing target 280 is detected before a key operation is detected.

When as in FIG. 6, the sensing target 280 is in an opposing position to an upper surface of each of the proximity sensors 110 (electrodes 262) entirely, in order to detect the proximity state before the key operation, the detection distance D2 can be set as greater than the detection distance D1, for example the detection distance D2 may be at least 0.2 mm.

However, if the detection distance D2 is too large a problem may arise of operation lock being performed during normal operation. In order to prevent operation lock from being performed at inappropriate times the detection distance D2 can be set as no greater than 10 mm, or alternatively may be set as no greater than 5 mm.

Alternatively, the detection distance D2 may be set as equal to the detection distance D1. The above is possible because execution of operation response processing can be blocked even if the key operation and the proximity state of the sensing target 280 are detected simultaneously.

In the present embodiment, the proximity sensors 110 differ from the keys 105 in shape and surface area, therefore a simple comparison cannot be made between the threshold value for key operation detection and the threshold value for proximity state detection. However, if hypothetically the proximity sensors 110 were identical to the keys 105 in shape and surface area, the threshold value for proximity state detection would be smaller than the threshold value for key operation detection.

Alternatively, the threshold value for proximity state detection may be set individually for each of the proximity sensors 110a, b.

[2.2.1c] Proximity State Determination

In Step S10, when each of the proximity sensors 110a, b detects the proximity state (when the capacitance measured value is at least equal to the threshold value for proximity state detection), a proximity state detection flag corresponding to the proximity sensor 110a, b is set to "On". When the proximity sensor 110 does not detect the proximity state (when the capacitance measured value is less than the threshold value for proximity state detection), the proximity state detection flag corresponding to the proximity sensor 110 is set to "Off".

[2.2.2] Operation Lock Necessity Judgment

In Step S11 a judgment is made with reference to the proximity state detection flags. When the two proximity sensors 110a, b both detect the proximity state, operation lock is judged to be necessary and processing proceeds to Step S12. In contrast, if at least one of the two proximity sensors 110a, b does not detect the proximity state, operation lock is judged to be unnecessary and processing proceeds to Step S13.

As explained above, operation lock is judged to be unnecessary unless the two proximity sensors 110a, b both detect the proximity state. The above is in order to ensure operation lock is not performed erroneously during normal operation.

In the mobile information device 100, each of the proximity sensors 110a, b is adjacent to at least one of the keys 105. Therefore, even during normal operation it is possible that in response to the finger of the user, one of the proximity sensors 110a, b detects the proximity state. If operation lock is performed even when only one of the proximity sensors 110 detects the proximity state, normal operation of the mobile information device 100 is inhibited.

The two proximity sensors 110a, b are disposed so that the operation block 106 is sandwiched between the two proximity sensors 110a, b, and therefore the two proximity sensors 110a, b are separated sufficiently to ensure that it is unlikely that both of the proximity sensors 110a, b respond to the finger, detecting the proximity state, during normal operation. In order that operation lock does not inhibit normal operation, detection of the proximity state by both of the proximity sensors 110a, b is set as a condition for operation lock.

Below is an explanation of why erroneous inputs may easily occur in situations where both of the proximity sensors 110a, b detect the proximity state of the sensing target, such as the human body.

Due to separation between the two proximity sensors 110a, b being sufficiently large, when the proximity state is detected by both of the proximity sensors 110a, b, it can be judged that a body part with a relatively high surface area such as a face, chest, palm or thigh is in proximity to the operation block 106.

Furthermore, as the proximity state is detected by the two proximity sensors 110a, b that sandwich the operation block 106 therebetween, it can be judged that a body part that covers the operation block 106 such as a palm or face is in proximity. More specifically, the above may occur in situations where (a) the front surface 102 of the mobile information device 100 is placed against the face during a telephone call, (b) the front surface 102 is positioned against the thigh or chest while the mobile information device 100 is stored in a pocket, and (c) the operation block 106 is covered by a hand when the hand grabs the mobile information device 100. In the situations described above, it is easy for erroneous inputs to occur due to the face or other body part contacting with the keys 105.

In order to prevent erroneous inputs, it is desirable that operation lock is performed when the proximity state is detected by both of the proximity sensors 110a, b.

As explained above, by performing operation lock only when both of the proximity sensors 110a, b detect the proximity state of the sensing target, erroneous inputs are prevented without inhibiting normal operation of the mobile information device 100.

[2.2.3] Switching Between Operation Lock and Operation Active Modes

In Step S12 the erroneous input preventing sub-unit 213 performs a procedure to lock key operations. Specifically, the erroneous input preventing sub-unit 213 instructs the key operation detecting sub-unit 211 to suspend the key operation detection procedure (for example by setting the operation lock flag to On). The key operation detecting sub-unit 211 suspends the key operation detection procedure in response to the instruction from the erroneous input preventing sub-unit 213. As a result, even when a key operation is performed the key operation is not detected, and thus operation response processing is not executed by the information processing sub-unit 210. In other words, key operations are locked and execution of operation response processing is blocked.

In contrast, if operation lock is not necessary, operation lock is released by the erroneous input preventing sub-unit 213 in Step S13 (switched to operation active mode). More specifically, the erroneous input preventing sub-unit 213 instructs the key operation detecting sub-unit 211 to recommence the key operation detection procedure (for example by setting the operation lock flag to Off), and the key operation detecting sub-unit 211 recommences the key operation detection procedure.

[2.2.4] Summary

Through the erroneous input prevention procedure described above, situations where unintentional inputs by a user (erroneous inputs) may easily occur are detected and by performing operation lock the erroneous inputs are prevented.

In the present embodiment the two proximity sensors 110a, b are disposed so that the operation block 106 is sandwiched between the two proximity sensors 110a, b in the width direction. Therefore, when the mobile information device 100 is stored in a pocket it is easy to detect situations where the chest or thigh of the user is in proximity to the operation block 106.

In the present embodiment the two proximity sensors 110a, b are centered in the longitudinal direction on the front surface 102. Therefore, when the ear of the user is placed against the mobile information device 100 during a telephone call, the proximity sensors 110 are positioned near the face of the user, and thus it is possible to detect when the face is in proximity to the operation block 106. By performing operation lock in response to the situation described above erroneous inputs are prevented.

In a further example, by disposing the two proximity sensors 110a, b so that the operation block 106 is sandwiched therebetween in the width direction, it is possible to detect a situation where a hand covers the operation block 106 in order to grab the mobile information device 100 as a situation where erroneous inputs can easily occur. The mobile information device 100 is long in the longitudinal direction and short in the width direction, therefore when the user grabs the mobile information device 100 using the hand it is easier to achieve with the hand spanning across the operation block 106 in the width direction. When the user grabs the mobile information device 100 as described above, the hand covers the operation block 106 and both of the proximity sensors 110. Therefore, the above situation where the hand covers the operation block 106 can be easily detected.

<3. Supplementary Explanation>

In the present embodiment N proximity sensors including at least two predetermined proximity sensors are configured by the two proximity sensors 110a, b. In other words, in the present embodiment the N proximity sensors and the at least two predetermined proximity are configured by the same proximity sensors.

In the present embodiment Step S11 is one example of "a first step of judging whether the proximity state is detected by at least two predetermined proximity sensors among the N proximity sensors". Alternatively, a combination of Steps S10 and S11 may be thought of as an example of the first step.

In the present embodiment Step S12 is one example of "a second step of blocking execution of the processing in response to the touch operation performed on the at least one of the keys, when judged in the first step that the at least two predetermined proximity sensors among the N proximity sensors detect the proximity state". Also, Step S13 is one example of "an activating step of activating execution of processing in response to the touch operation performed on the at least one of the keys, when judged in the first step that the at least two predetermined proximity sensors do not both detect the proximity state". Alternatively, a combination of Steps S12 and S13 may be thought of as a single step.

In the present embodiment Step S10 is one example of "a detecting step of detecting a proximity state of a sensing target through N proximity sensors".

In the present embodiment, each of the proximity sensors 110a, b is longer in the longitudinal direction than each of the keys 105. Consequently, during normal operation a proportion of surface area of each of the proximity sensors 110 where the finger 260 is in an opposing position will be smaller than a proportion of surface area of each of the keys 105 where the finger 260 in an opposing position. Therefore, the proximity sensors 110 have low responsiveness to the finger 260 during normal operation, and possibility of operation lock being performed erroneously during normal operation is further reduced.

The threshold value for proximity state detection for each of the proximity sensors 110 is set for situations where it is imagined that a body part with a large surface area, such as a face or chest, covers surfaces of the proximity sensors 110 entirely. Therefore, if for example the finger 260 only covers ¼ of the surface area of one of the proximity sensors 110 (a proportion of the surface area where the finger is in an opposing position is only ¼ of total surface area), the capacitance measured value will only be approximately ¼ of the capacitance measured value when the entire surface area is covered. Consequently, it is possible to reduce responsiveness of the proximity sensors 110 to the finger 260 by setting a shape of each of the proximity sensors 110 so that it is difficult for the finger 260 to cover the proximity sensor 110 entirely, for example by setting each of the proximity sensors 110 to be at least twice as long in the longitudinal direction of as each of the keys 105.

Alternatively, each of the proximity sensors 110 may be set as at least three times longer in the longitudinal direction than each of the keys 105. By further increasing length in the longitudinal direction of each of the proximity sensors 110, the proportion of the surface area of the proximity sensor 110 where the finger 260 is in the opposing position during normal operation is further reduced. Consequently, responsiveness of the proximity sensors 110 to the finger 260 and possibility of operation lock being performed erroneously during normal operation are both further reduced. Alternatively, the larger the surface area of each of the proximity sensors 110, the larger the detection distance D2 can be increased to.

In the present embodiment the proximity sensors 110 are only configured with an aim of detecting proximity of sensing targets such as the human body. Therefore, even if a touch operation is performed on any one of the proximity sensors 110, operation response processing is not executed.

In the present embodiment operation lock (blocking execution of operation response processing) is performed by suspension of the key operation detection procedure. Operation lock may also be performed by alternative methods including (i) suspending the key scan procedure of the keys 105 performed by the capacitance measuring unit 207 and overwriting the capacitance measured values in the measured value register 208 with a value lower than the threshold value for key operation detection (0 for example), (ii) instructing the key operation detecting sub-unit 211 not to send the ID code for a detected key operation to the information processing sub-unit 210, and (iii) instructing the information processing sub-unit 210 not to execute operation response processing even when a key operation is detected.

In Step S12, when the operation lock flag is set to On, an instruction may simultaneously be sent to the driver unit 205 to suspend electrical power supply to the key backlight 206. The above allows reduction in electrical power usage by the mobile information device 100. In Step S12 an instruction may also be sent to the display control unit 204 to set the backlight of the display 104 to Off.

In the present embodiment the capacitance measuring unit 207 is separate from the control unit 200, but alternatively the capacitance measuring unit 207 may be included within the control unit 200.

The capacitance measuring unit 207 acquires a value showing separation of the sensing target from each of the proximity sensors 110 in a direction perpendicular to the front surface 102, thus the capacitance measuring unit 207 could also be referred to as a separation information obtaining unit.

In the present embodiment, the proximity sensor 110 detecting the proximity state of the sensing target refers to a state where the coupled capacitance Cp of the proximity sensor 110 is at least equal to a predetermined value. However, in the above state it is not possible for the control unit 200 to determine whether the proximity state has been detected. Therefore, it is necessary to measure a value indicating magnitude of the coupled capacitance Cp through the capacitance measuring unit 207, and determine if the proximity state has been detected based on whether the measured value from the capacitance measuring unit 207 is at least equal to a threshold value.

The keys 105 and the proximity sensors 110 on the front surface 102 are not limited to being quadrilateral in planar view of the mobile information device 100, and may for example be oval instead.

In the present embodiment upper surfaces of the electrodes 261 and 262 have an equal height position in a z-axis of the mobile information device 100. Alternatively, the upper surfaces of the electrodes 261 may have a different height position in the z-axis compared to the upper surfaces of the electrodes 262. For example, the upper surfaces of the electrodes 262 may be positioned higher in the z-axis than the upper surfaces of the electrodes 261.

FIRST MODIFIED EXAMPLE

In the embodiment the two proximity sensors 110 are each adjacent to the keys 105. In addition to the two proximity sensors 110, an ear sensor may be disposed adjacent to the receiver 103 in order to detect contact with the ear of the user as in the conventional art. Through use of the ear sensor, operation lock can be performed while the ear of the user is placed against the receiver 103 during a telephone call, thus erroneous inputs that occur if the face of the user contacts with the keys 105 can be prevented. The present modified example has a configuration where the ear sensor relating to the conventional art is used in addition to the two proximity sensors 110 to prevent erroneous inputs.

<Configuration>

Figure 7:
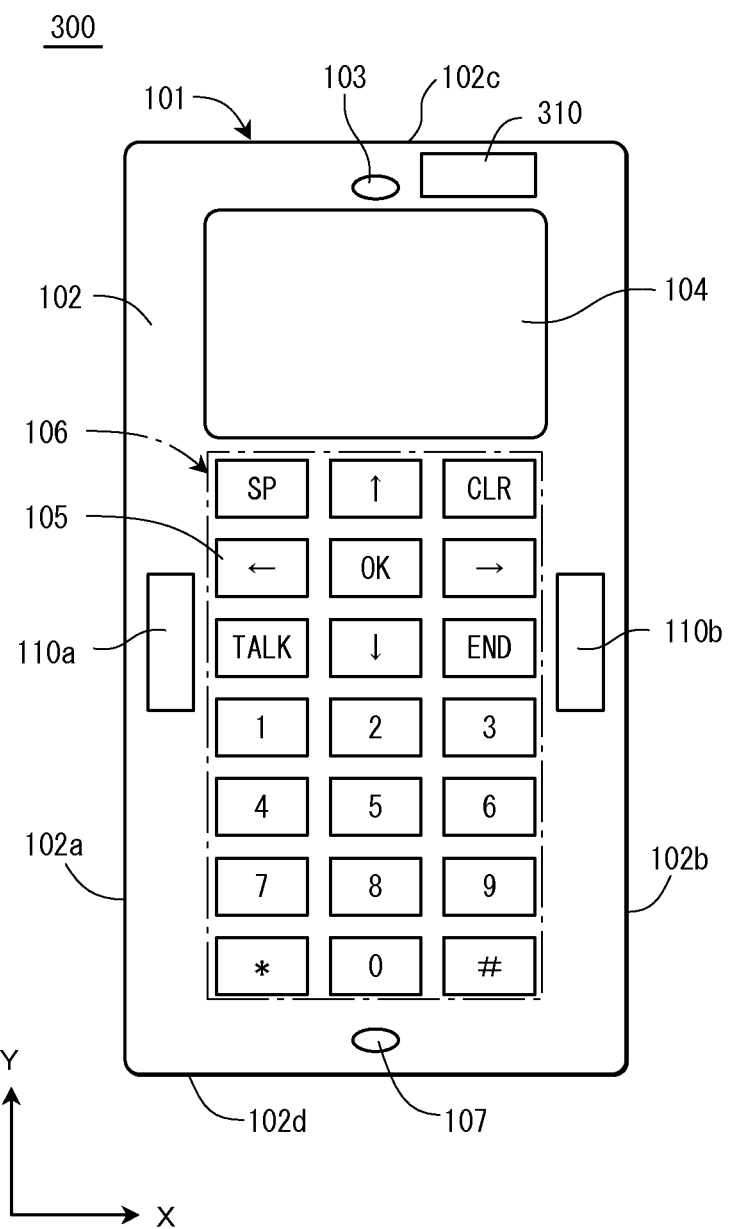
FIG. 7 is a planar schematic view of an external configuration of a mobile information device 300 relating to a first modified example.

FIG. 7 is a front external view of a mobile information device 300 relating to the first modified example.

The mobile information device 300 has the same configuration as the mobile information device 100 (refer to FIG. 1 and FIG. 2), and further includes an ear sensor 310, configured to detect a situation where the receiver 103 is placed against the ear of the user or is in proximity to the ear of the user. The ear sensor 310 is adjacent to the receiver 103 on the front surface 102. The ear sensor 310 includes an electrode and a cover unit in the same way as each of the proximity sensors 110.

The electrode of the ear sensor 310 is connected to the capacitance measuring unit 207, however for simplification this is omitted in the drawings. In the key scan procedure (Step S3) the capacitance measuring unit 207 supplies a pulse to the electrode of the ear sensor 310 and obtains a capacitance measured value for the ear sensor 310. In the key scan procedure, time intervals between successive measurements of capacitance are the same for the ear sensor 310 and the proximity sensors 110, but alternatively the time interval for the ear sensor 310 and the time interval for the proximity sensors 110 may be different.

<Operation>

Figure 8:
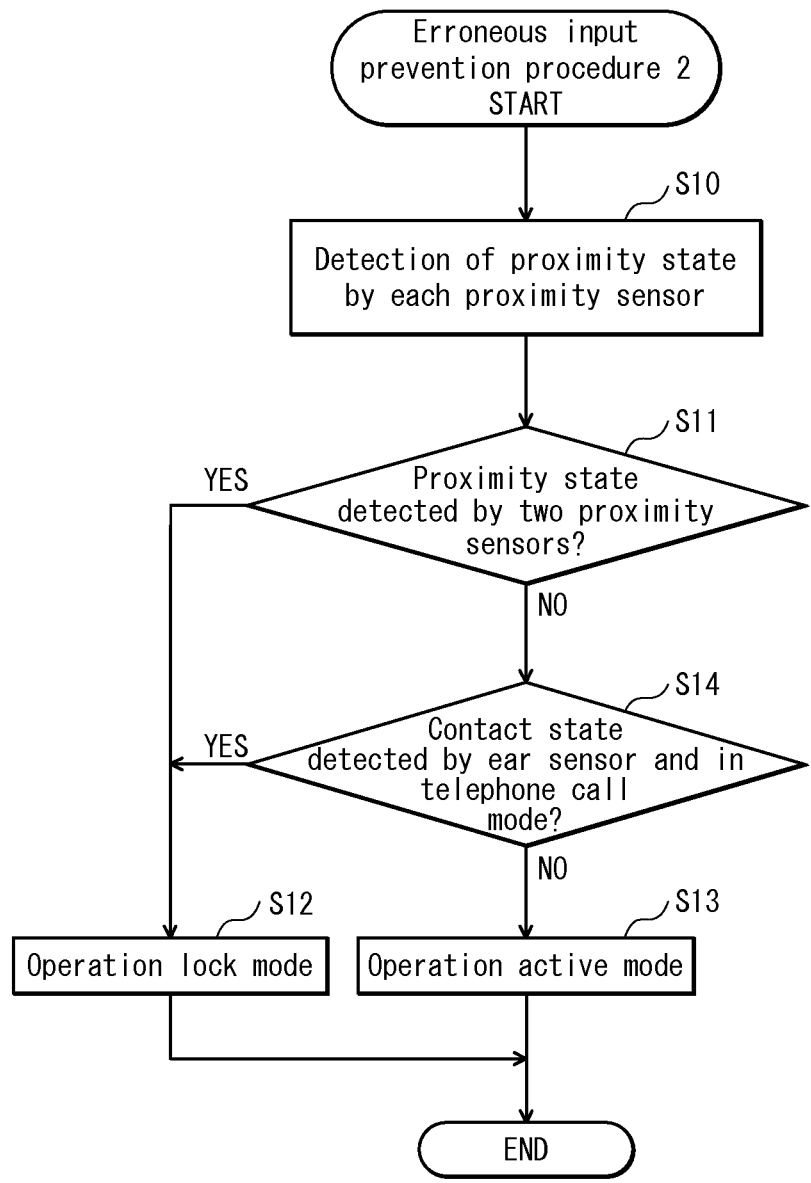
FIG. 8 is a flowchart showing an erroneous input prevention procedure 2 in the first modified example.

FIG. 8 is a flowchart showing the erroneous input prevention procedure 2 in the first modified example.

The erroneous input prevention procedure 2 is the same as the erroneous input prevention procedure in the embodiment, but further includes Step S14. Therefore, description of Steps S10 to S13 is omitted.

Step S14 is performed when there is a No determination in Step S11. There is a No determination in Step S11 when at least one of the two proximity sensors 110a, b does not detect the proximity state and therefore operation lock is judged to be unnecessary.

In Step S14 operation lock is judged to be necessary if both (i) the mobile information device 300 is in telephone call mode, and (ii) the capacitance measured value for the ear sensor 310 is at least equal to a threshold value for the ear sensor (the ear sensor detects a contact state). In Step S12 the operation lock flag is set to On and the mobile information device 300 is set in operation lock mode. As a result, execution of operation response processing shown in Step S4 of FIG. 4 is blocked and erroneous inputs are prevented.

If the mobile information device 300 is not in telephone call mode and/or if the ear sensor 310 does not detect the contact state, operation lock is judged to be unnecessary in Step S14. As a result, in Step S13 the operation lock flag is set to Off and the mobile information device 300 is set in operation active mode. Therefore, if the mobile information device 300 is moved away from the ear, operation response processing can be executed even in telephone call mode.

The mobile information device 300 is considered to be in telephone call mode between a start time, when there is input of a connect key (TALK key) commencing or receiving a telephone call, and an end time, when there is input of a disconnect key (END key) disconnecting the telephone call.

<Summary>

In the mobile information device 300, two different types of determination are performed in Steps S11 and S14, therefore compared to the embodiment, the first modified example is more effective at preventing erroneous inputs.

For example, the mobile information device 300 is effective at preventing erroneous inputs occurring during telephone call mode while the ear is in contact with the ear sensor 310. The mobile information device 300 is also able to prevent erroneous inputs that occur if the face of the user contacts with the keys 105 before the ear contacts with the ear sensor 310 when moving the mobile information device 300 toward the ear to commence a telephone call. The above may occur for example due to the user bumping into a person or object.

Furthermore, after a Yes determination in either one of Steps S11 and S14, even if subsequently there is a change to a No determination in both Steps S11 and S14, operation lock may be maintained for a predetermined time (approximately one second for example). Reasoning behind the above is that it is unlikely that there will be normal operation immediately after changing to No determinations in both Steps S11 and S14, therefore it is preferable to maintain operation lock in order to prevent erroneous inputs. Maintaining operation lock as described above may also be appropriate for use in the embodiment or other modified examples.

In Step S14, the determination may be made based only on whether the ear sensor 310 detects the contact state, with the condition that the mobile information device 300 is in telephone call mode being removed.

In the present modified example N proximity sensors and at least two predetermined proximity sensors are configured by the two proximity sensors 110a, b. In other words, in the present modified example the N proximity sensors and the at least two predetermined proximity sensors are configured by the same proximity sensors.

The threshold value for the ear sensor may be changed so that the ear sensor 310 functions as a proximity sensor in the same way as the proximity sensors 110. In the above case, the ear sensor 310 is included in the N proximity sensors, but is not included in the at least two predetermined proximity sensors among the N proximity sensors.

SECOND MODIFIED EXAMPLE

The mobile information device 100 in the embodiment and the mobile information device 300 in the first modified example included two proximity sensors 110. Alternatively, the mobile information device 100 and the mobile information device 300 may include four proximity sensors 110. By performing operation lock when the proximity state is detected by two of the four proximity sensors 110, effectiveness of erroneous input prevention can be increased.

Figure 9:
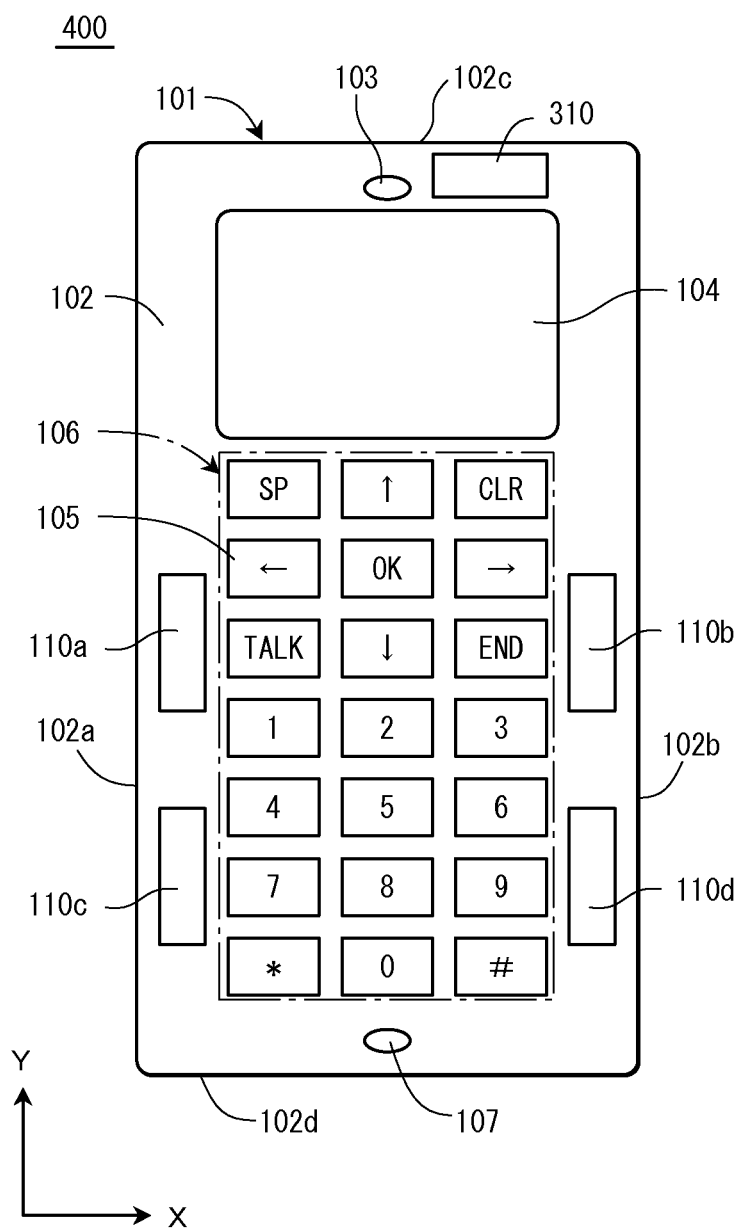
FIG. 9 is a planar schematic view of an external configuration of a mobile information device 400 relating to a second modified example.

FIG. 9 is a front external view of a mobile information device 400.

<Configuration>

The mobile information device 400 has the same configuration as the mobile information device 300 (refer to FIG. 1, FIG. 2 and FIG. 7), and further includes two proximity sensors 110c, d. The proximity sensor 110c is disposed on the front surface 102 in alignment in the longitudinal direction with the proximity sensor 110a, and the proximity sensor 110d is disposed on the front surface 102 in alignment in the longitudinal direction with the proximity sensor 110b. Each two proximity sensors aligning in the longitudinal direction (110a, c and 110b, d) are separated from one another by a distance equivalent to at least one key 105.

The proximity sensors 110c, d, like the proximity sensors 110a, b, each include an electrode 262 and a cover unit 264.

The electrode 262 of each of the proximity sensors 110c, d is connected to the capacitance measuring unit 207. In the key scan procedure, the capacitance measuring unit 207 measures capacitance of the proximity sensors 110c, d in the same way as the proximity sensors 110a, b.

<Operation>

Figure 10:
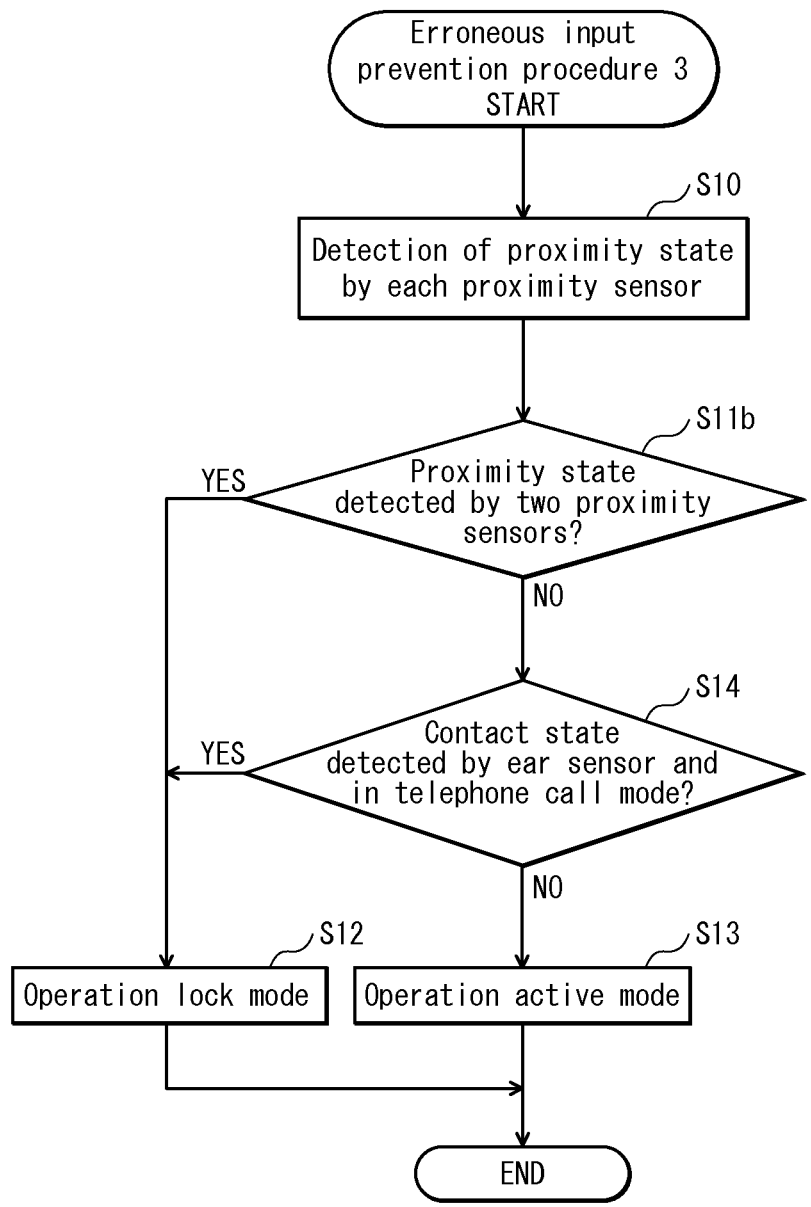
FIG. 10 is a flowchart showing an erroneous input prevention procedure 3 in the second modified example.

FIG. 10 is a flowchart showing the erroneous input prevention procedure 3 in the second modified example.

The erroneous input prevention procedure 3 is the same as the erroneous input prevention procedure 2 in the first modified example, but Step S11 is modified to give Step S11b. Therefore, explanations of Step S10 and Steps S12 to S14 are omitted.

In Step S11b it is determined whether at least two of the four proximity sensor 110a-d detect the proximity state. When the capacitance measured value of the at least two of the four proximity sensors 110a-d is at least equal to the threshold value for proximity state detection, operation lock is judged to be necessary. As a result, in Step S12 operation lock is performed and erroneous inputs are prevented.

In the second modified example, possible combinations of two of the four proximity sensors 110 include: proximity sensors 110a, b; proximity sensors 110a, c; proximity sensors 110b, d; and proximity sensors 110c, d.

The combination of proximity sensors 110a, b has the same effect as in the embodiment and the first modified example.

Combinations of two proximity sensors 110 aligned in the longitudinal direction (proximity sensors 110a, c and proximity sensors 110b, d) may be applicable for example in a situation where the mobile information device 400 is stored in a pocket and a surface of the body of the user is inclined relative to the surface 102 of the mobile information device 400.

Figure 11:
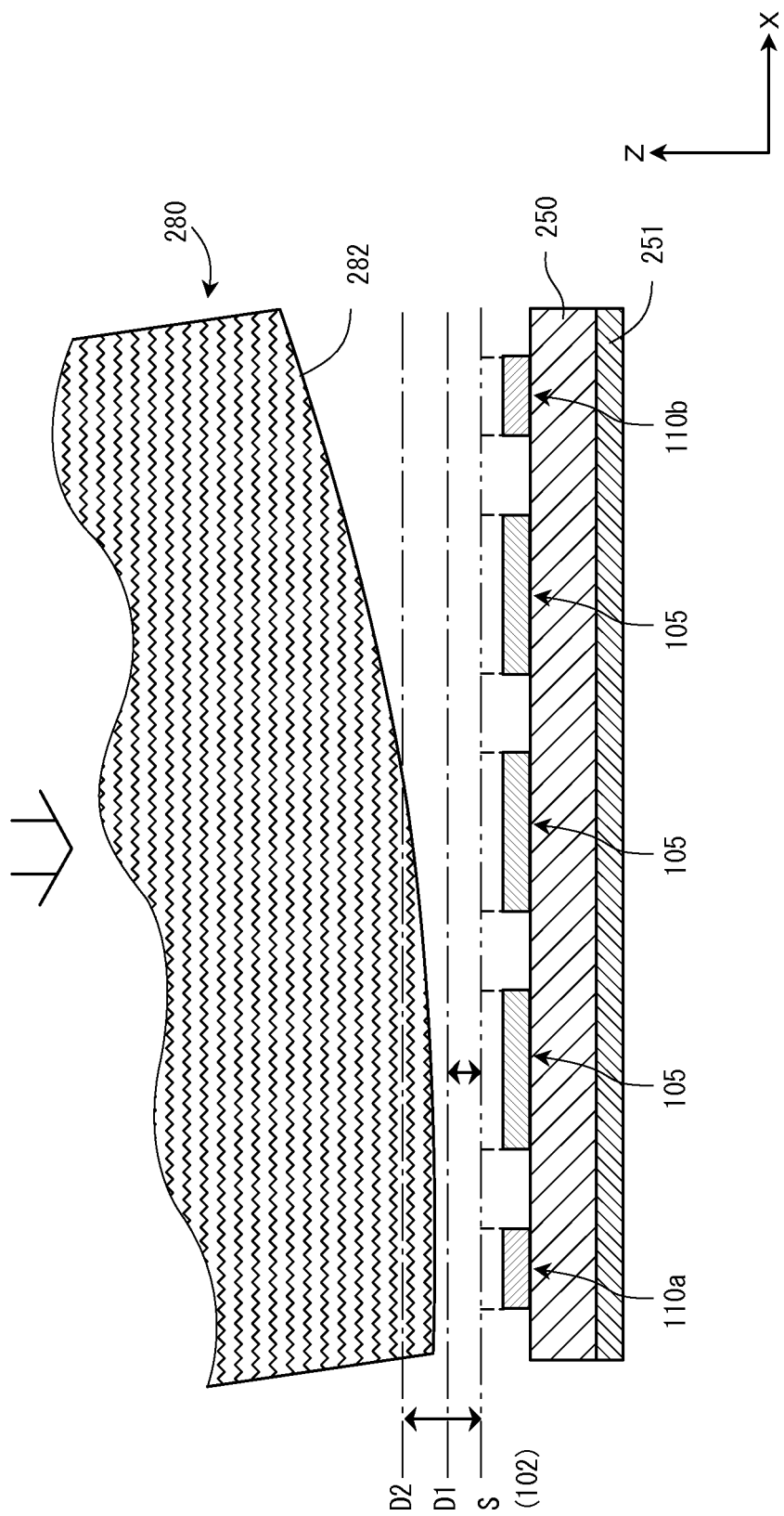
FIG. 11 is a schematic diagram showing a situation where a surface of a sensing target 280 is inclined relative to a surface S of the keys 105.

FIG. 11 shows one example of a situation where the sensing target 280 (human body) is inclined relative to the front surface 102. In the example in FIG. 11, the mobile information device 400 is positioned so that the proximity sensors 110a, c are in proximity to the sensing target 280 and the proximity sensors 110b, d are separated from the sensing target 280.

In the situation above, for each two proximity sensors 110 aligned in the width direction (proximity sensors 110a, b and proximity sensors 110c, d), at least one of the two proximity sensors 110 aligned in the width direction does not detect the proximity state. When the mobile information device 400 is stored in a pocket and a surface of a curved body part such as a thigh (corresponding to opposing surface 282 in FIG. 11) is in proximity to the mobile information device 400 creating a situation such as described above, there is a possibility of erroneous inputs occurring due to contact through clothing with the keys 105 (the possibility is especially high for the keys 105 at the bottom right and bottom left of the mobile information device 400). Therefore, in order to prevent erroneous inputs it is desirable that operation lock is performed when the proximity sensors 110a, c, which are aligned in the longitudinal direction of the mobile information device 400, both detect the proximity state.

In the situation shown in FIG. 11, the front surface 102 is inclined, relative to the opposing surface 282, about an axis in the longitudinal direction.

The combination of the two proximity sensors 110c, d disposed on a bottom section (section including the microphone 107) of the mobile information device 400 have a similar effect to the combination of the two proximity sensors 110a, b. Due to differences in positioning compared to the two proximity sensors 110a, b, it is unlikely that the two proximity sensors 110c, d are in proximity to the face of the user during a telephone call.

However, there are situations where the combination of the two proximity sensors 110c, d is effective but the combination of the two proximity sensors 110a, b is not. For example, the combination of the two proximity sensors 110c, d is effective when the mobile information device 400 is stored in a jacket pocket so that the bottom section of the mobile information device 400 is in proximity to the body, but a top section (section including the receiver 103) of the mobile information device 400 is separated from the body. The above situation may occur when the mobile information device 400 is stored in the jacket pocket in the longitudinal direction and due to weight of the mobile information device 400 the mobile information device 400 becomes inclined. In the situation above, the two proximity sensors 110a, b that are central in the longitudinal direction of the mobile information device 400 may not detect the proximity state. Also, due to the body having a curved surface, in the situation described above there is a possibility of erroneous inputs occurring due to contact through clothing with the keys 105 (the possibility is especially high for keys 105 at the bottom right and bottom left of the mobile information device 400). Therefore, in order to prevent erroneous inputs it is desirable that operation lock is performed when the two proximity sensors 110c, d disposed on the bottom section of the mobile information device 400 both detect the proximity state.

In the situation described above, the front surface 102 is inclined, relative to the opposing surface 282, about an axis in the width direction.

Further to the examples above, operation lock may also be performed when a combination of the two proximity sensors 110a, d both detect the proximity state, or alternatively when a combination of the two proximity sensors 110b, c both detect the proximity state.

In the present modified example, the two proximity sensors 110a, c aligned in the longitudinal direction are separated by a distance equivalent to at least one key 105. Through the above configuration it is unlikely that the two proximity sensors 110a, c both detect the proximity state during normal operation, inhibiting normal operation of the mobile information device 400.

<Summary>

In the present modified example, through configuration so that operation lock is performed when at least two of the four proximity sensors 110a-d detect the proximity state, the mobile information device 400 effectively prevents erroneous inputs in a wide range of situations.

In the present modified example, the "N proximity sensors" are configured by the four proximity sensors 110, and the "at least two predetermined proximity sensors" are configured by any combination of two of the four proximity sensors 110.

When any combination of two of the four proximity sensors 110 described above detects the proximity state, operation lock is performed irrespective of whether proximity sensors 110 not included in the one combination detect the proximity state or not. In other words, in the present modified example, operation lock is also performed when three or more of the four proximity sensors 110 detect the proximity state.

The present modified example may also have a configuration where more than two proximity sensors (three proximity sensors for example) are aligned in the longitudinal direction, and operation lock may be performed when all of the three proximity sensors detect the proximity state. In the above configuration, the "at least two predetermined proximity sensors" are configured by the three proximity sensors aligned in the longitudinal direction.

In the present modified example, the ear sensor 310 may alternatively be omitted.

THIRD MODIFIED EXAMPLE

Figure 12:
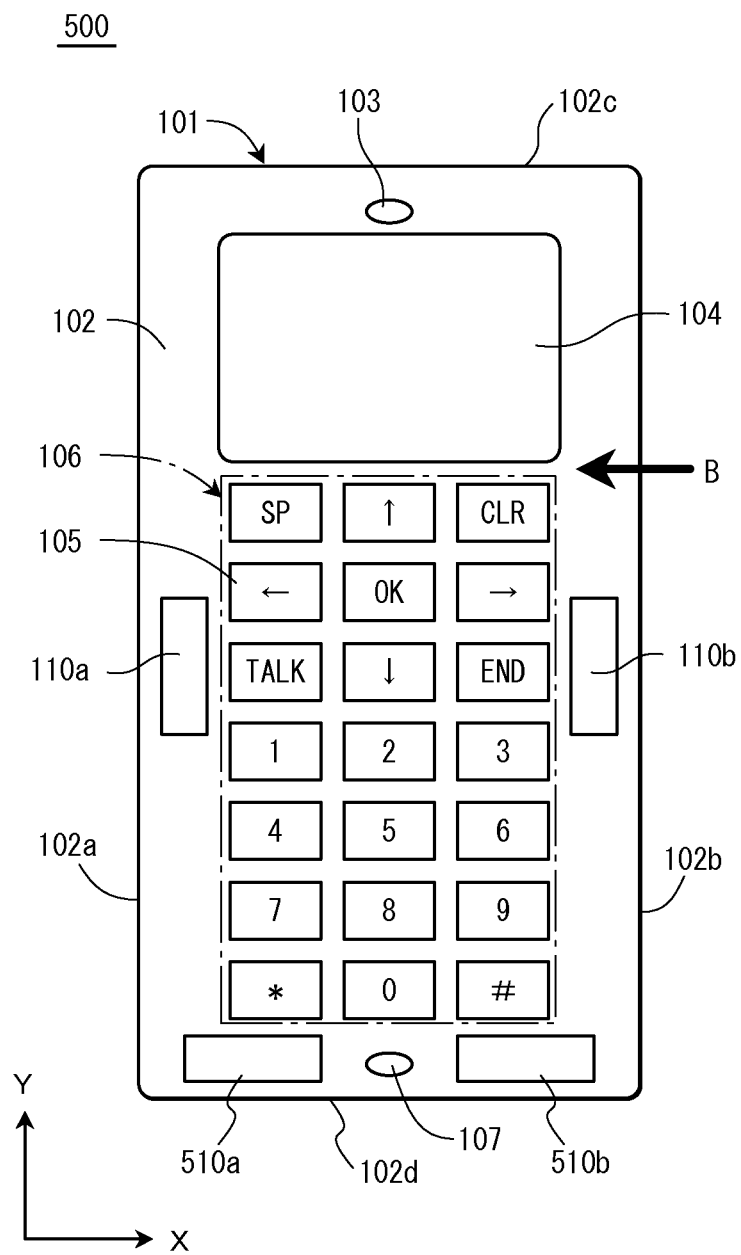
FIG. 12 is a planar schematic view of an external configuration of a mobile information device 500 relating to a third modified example.

In the embodiment, the first modified example and the second modified example, each of the proximity sensors 110 is between the operation block 106 and the left side 102a or between the operation block 106 and the right side 102b. Alternatively, proximity sensors may be positioned between the operation block 106 and the bottom side 102d.
<Configuration>
FIG. 12 is a planar schematic view of the external configuration of the mobile information device 500 relating to the third modified example.

The mobile information device 500 has the same configuration as the mobile information device 100, and further includes two proximity sensors 510a, b. The two proximity sensors 510a, b are disposed on the front surface 102 between the operation block 106 and the bottom side 102d. The two proximity sensors 510a, b are aligned with one another in the width direction and sandwich the microphone 107 therebetween.

The two proximity sensors 510a, b are separated in the width direction by a distance equivalent to at least one key 105. Consequently, it is highly unlikely that the two proximity sensors 510a, b both detect the proximity state during normal operation.

As described for the proximity sensors 110a, b, the proximity sensors 510a, b each include an electrode and a cover unit (refer to FIG. 3). The proximity sensors 510a, b are connected to the capacitance measuring unit 207 and capacitance of each of the proximity sensors 510a, b is measured during the key scan procedure.
<Operation>
The erroneous input prevention procedure 4 performed in the present modified example is equivalent to the erroneous input prevention procedure 3 shown in FIG. 10, but with omission of Step S14. Equally, the erroneous input prevention procedure 4 may be considered equivalent to the erroneous input prevention procedure shown in FIG. 5, but with Step S11 substituted for Step S11b shown in FIG. 10. The erroneous input prevention procedure 4 can be easily understood from explanations of the embodiment and the second modified example, therefore explanation of the erroneous input prevention procedure 4 is omitted.

Differences in effects of the proximity sensors 510a, b in the mobile information device 500 and the proximity sensors 110c, d in the mobile information device 400, occurring due to differences in positioning, are explained below.

In contrast to the proximity sensors 110c, d, each of the proximity sensors 510a, b is adjacent to the bottom side 102d, and is long in the width direction. Consequently, the proximity sensors 510a, b are effective at preventing erroneous inputs in situations such as when the mobile information device 500 is stored in a shirt pocket, and the bottom section of the mobile information device 500 is close to the body but the top section of the mobile information device 500 is separated from the body.

Furthermore, as the proximity sensor 510a is adjacent to the left side 102a and the proximity sensor 510b is adjacent to the right side 102b, the proximity sensors 510a, b are also effective in situations such as shown in FIG. 11 where the front surface 102 is inclined, relative to the opposing surface 282, about the axis in the longitudinal direction. In the above situation the proximity state of the sensing target 280 can be detected by a combination of the proximity sensors 110a and 510a or by a combination of the proximity sensors 110b and 510b.
<Summary>
In the present modified example, by performing operation lock when at least two of the four proximity sensors 110a, b and 510a, b detect the proximity state, the mobile information device 500 effectively prevents erroneous inputs in a wider range of situations.

In the present modified example, the "N proximity sensors" are configured by the four proximity sensors 110a, b and 510a, b, and the "at least two predetermined proximity sensors" are configured by any combination of two of the four proximity sensors 110a, b and 510a, b.

Two proximity sensors may be positioned on the mobile information device 500 in the same way as the proximity sensors 510a, b at a position shown by an arrow B in FIG. 12. In order to allow the above configuration, length of the housing 101 in the longitudinal direction, and separation between the operation block 106 and the display unit 104 may be increased, allowing the two proximity sensors to be disposed between the display unit 104 and the operation block 106 in the longitudinal direction, aligned with one another in the width direction. The above described configuration is effective at preventing erroneous inputs occurring when the face of the user contacts with the keys 105 during a telephone call. The two proximity sensors described above may be included in substitution for the proximity sensors 110a, b or in addition to the proximity sensors 110a, b. Alternatively, the two proximity sensors described above may be included in the mobile information device and the proximity sensors 110a, b and 510a, b may be omitted.

As described above for the embodiment and the modified examples, in the mobile information devices relating to the present invention (i) by positioning each proximity sensor adjacent to at least one of the keys it is possible to detect when sensing targets, such as the human body, are in proximity to the keys, and (ii) through blocking execution of processing in response to key operations when the proximity state of the sensing target is detected by at least two predetermined proximity sensors separated from one another, it is possible to prevent erroneous inputs without inhibiting normal operation of the mobile information device.

[Supplementary Explanation]

(a) The embodiment and modified examples described above are merely examples used to explain the present invention. It is possible to make various modifications or improvements that are also included within the scope of the present invention.

(b) If the mobile information device relating to the present invention is configured as a cellular telephone, the cellular telephone may be one of various types including bar, folding and slide types. For folding and slide type cellular telephones, when the cellular telephone is not in use the keys are covered, but the present invention is still applicable for preventing erroneous inputs occurring during telephone calls and in other situations where the keys are exposed. For example, erroneous inputs can also be prevented in a situation where the keys are covered by a hand grabbing the cellular telephone while the keys are exposed.

(c) In the embodiment and the modified examples, judgment whether to perform operation lock is based only on the capacitance measured value of each of the proximity sensors 110 and the like, but alternatively the judgment may also be based on the capacitance measured value of each of the keys 105. For example, consider a situation where the two proximity sensors 110a, b both detect the proximity state and any one of the keys 105 also detects the contact state. Subsequently, even if one of the two proximity sensors 110a, b no longer detects the proximity state, operation lock may be maintained so long as the other of the two proximity sensors 110a, b still detects the proximity state and the one of the keys 105 still detects the contact state.

Alternatively, in the above situation where the two proximity sensors 110a, b both detect the proximity state and the one of the keys 105 also detects the contact state, even if subsequently the two proximity sensors 110a, b both no longer detect the proximity state, operation lock may be maintained so long as the one of the keys 105 still detects the contact state.

When the mobile information device 100 (or any of the mobile information devices in the modified examples) rotates around the y-axis (or x-axis) separating from the sensing target, such as the human body, the human body may separate from one of the two proximity sensors 110a, b but remain in contact with the key 105. The configuration described above prevents erroneous inputs from occurring in the above situation.

(d) The capacitance measuring unit 207 in not limited to the configuration described in the embodiment and alternatively may be configured using a commonly known integrated circuit, electric circuit or the like. For example, the capacitance measuring unit 207 may also be configured as a circuit for measuring an electric potential change in a capacitor (electrodes 261 and 262), or as a circuit for measuring an electrical discharge current. If the capacitance measuring unit 207 is configured as a circuit for measuring electrical discharge current, by repeated charging and discharging to the coupled capacitance Cp, it is possible to measure a time required to charge another capacitor to a predetermined voltage using the electrical discharge. Alternatively, by repeatedly charging and discharging to the coupled capacitance Cp, a time required to through the repeated charging, to charge another capacitor connected in parallel with the coupled capacitance Cp to a predetermined voltage, may be measured.

(e) The N proximity sensors may alternatively be disposed so that a center point of each of the proximity sensors is separated from the center point of each other proximity sensor by a distance equivalent to at least two keys. The above configuration may be desirable when two proximity sensors having a long shape (rectangular for example) in planar view, are aligned in the longitudinal direction.

(f) In the embodiment and the modified examples, the conductive film 251, which is a grounding electrode, is formed on the rear surface of each of the electrodes 261, 262 of the keys 105 and the proximity sensors 110. The grounding electrode may also be formed surrounding each of the electrodes 261, 262.

(g) Configurations and effects of various mobile information devices relating to the embodiment are described below.

(1) A mobile information device relating to the present embodiment comprises: a housing; a plurality of keys disposed on one surface of the housing; a control unit configured to execute processing in response to a touch operation performed on at least one of the keys; and N proximity sensors (N≥2) disposed on the surface of the housing, and each configured to detect a proximity state of a sensing target, wherein when at least two predetermined proximity sensors among the N proximity sensors detect the proximity state, the control unit blocks the processing in response to the touch operation on the at least one of the keys.

The mobile information device described above is able to prevent erroneous inputs even in situations where a conventional mobile information device cannot prevent erroneous inputs. A detailed explanation is given below.

The mobile information device described above includes at least two predetermined proximity sensors. When the sensing target, such as a human body, is in proximity to the surface and all of the at least two predetermined proximity sensors detect the proximity state, it is possible that the sensing target may contact with the keys causing erroneous inputs. Therefore, by blocking execution of processing in response to touch operations it is possible to prevent erroneous inputs occurring when the sensing target contacts with any of the keys.

Consequently, it is possible to prevent erroneous inputs by blocking execution of processing in response to touch operations (referred to as operation response processing below) in situations where erroneous inputs that are not intended by a user may easily occur. For example, the situations described above may include a situation where the mobile information device contacts with the human body while stored in a pocket (in the example contact is made through clothing).

A situation where the sensing target is in proximity may simply be referred to as a "proximity state" or a "proximity state of the sensing target".

Possible sensing targets include the human body and may also include objects other than the human body. Erroneous inputs may also be caused by contact with sensing targets other than the human body (for example metals), though the human body is used as an example of the sensing target for purposes of explaining the present invention.

In the mobile information device described above, all of the at least two predetermined proximity sensors detecting the proximity state of the sensing target is set as a condition for blocking execution of operation response processing. The above condition ensures that during normal operation, when intentional operations are being made by the user, it is unlikely that execution of operation response processing is blocked inhibiting normal operation.

Normal operation refers to situations where the user lightly presses any one of the keys using a finger (or thumb) to perform an operation. In the above situation no object other than the finger is positioned above the keys. For example, a thumb of a hand may be performing a light pressing operation on one of the keys while four fingers and a palm of the hand are gripping a side of the mobile information device.

During normal operation when the user is performing key operations using only the thumb, it is unlikely that the at least two predetermined proximity sensors, for example both of two proximity sensors, detect the proximity state. Conversely, if both of the two proximity sensors detect the proximity state of the human body, it can be judged that normal operation is not being performed.

When only one of the two proximity sensors detects the proximity state of the human body, there is a high probability that normal operation is being performed, therefore processing to prevent erroneous inputs is not performed and execution of operation response processing is not blocked. Thus, normal operation of the mobile information device is not inhibited in the above situation. Also, when neither of the two proximity sensors detects the proximity state of the human body, it is judged that there is no possibility of erroneous inputs occurring, and therefore processing to prevent erroneous inputs is not performed. Thus, normal operation of the mobile information device is not inhibited in the above situation.

The proximity sensors are able to detect the proximity state of the sensing target at least in terms of a perpendicular direction to the surface. The above is based on erroneous inputs easily occurring due to contact between the sensing target and the keys when the sensing target is in proximity in terms of the perpendicular direction to the surface.

The proximity state of the sensing target may refer to a situation where distance between each of the proximity sensors and the sensing target is no greater than 10 mm. Also, each of the proximity sensors may detect the proximity state of the sensing target when distance between the sensing target and the proximity sensors is at least 0.2 mm.

The at least two predetermined proximity sensors and the N proximity sensors may be equal in number. In the above situation, execution of operation response processing is blocked when all of the N proximity sensors detect the proximity state of the sensing target.

Each of the proximity sensors may be configured for example as a capacitive sensor and an Infra-Red (IR) sensor. A capacitive sensor can function as a proximity sensor by detecting a coupling capacitance between the capacitive sensor and the sensing target. Sensing targets for capacitive sensors include the human body, conductors and other objects that can function as an electrode of a capacitor. Sensing targets for IR sensors include objects that reflect IR rays.

The keys can be operated (touch operation) by application of a relatively small amount of force, or even just by a light touch, and may for example be touch sensors type keys. Each key includes a sensor, which for example may be configured as a capacitive sensor or a pressure sensitive sensor. A pressure sensitive sensor may be used for a key, in which pressing of the key deforms the pressure sensitive sensor causing a variation in a parameter such as resistance or capacitance.

If the proximity sensors are configured as capacitive sensors, the keys may also be configured as capacitive sensors. Alternatively, if the proximity sensors are configured as IR sensors, the keys may be configured as pressure sensitive sensors.

Processing in response to a touch operation on any one of the keys (operation response processing) may for example be processing corresponding to the one key in a program executed by the control unit. For example, as a result of a selection from an operation menu a selected application may be started, or as a result of input of a number or letter a screen display may be updated.

In contrast to the above, blocking execution of operation response processing may mean for example not detecting the touch operation on the key, not notifying a program for executing operation response processing of a detection result of the touch operation, or giving an instruction to the program for executing operation response processing prohibiting execution of the operation response processing.

(2) In the mobile information device described above, the at least two predetermined proximity sensors may be separated from one another by a distance equivalent to at least one key, and may be adjacent to at least one of the keys.

In the mobile information device described above, (i) the at least two predetermined proximity sensors being adjacent to at least one of the keys means that it is possible to detect when the sensing target, such as the human body, is in proximity to the keys, and (ii) blocking execution of operation response processing only when all of the at least two predetermined proximity sensors, separated spatially from one another, detect the proximity state of the sensing subject, means that it is possible to prevent erroneous inputs without inhibiting normal operation.

Consequently, it is possible to prevent erroneous inputs by blocking execution of operation response processing in situations where erroneous inputs that are not intended by a user may easily occur. For example, the situations described above may include a situation where the mobile information device contacts with the human body while stored in a pocket (in the example contact is made through clothing).

In the mobile information device described above, detection of the proximity state of the sensing target by all of the at least two predetermined proximity sensors, separated from one another by the distance equivalent to at least one key, is set as a condition for blocking execution of operation response processing. The above condition ensures that when normal operations (intentional operations) are being performed by the user, execution of operation response processing is not blocked inhibiting normal operation.

In general, the keys are of a size appropriate for operation by a finger. Therefore, it is unlikely that two proximity sensors separated by the distance equivalent to at least one key will both detect the proximity state of the finger. The above configuration gives greater accuracy in ensuring that execution of operation response processing is not blocked during normal operation. Alternatively, two proximity sensors may be separated by a distance equivalent to at least two keys.

When the proximity state of the sensing target is detected by all of the at least two predetermined proximity sensors, there is a high probability that a body part with a larger surface area than the single finger (e.g. face, chest, palm or thigh) is in proximity to the surface. In the type of situation described above there is a high probability that erroneous inputs will occur, and therefore execution of operation response processing is blocked.

Separated by a distance equivalent to at least one key means that for example, if the keys are arranged in a matrix of rows and columns, for two proximity sensors aligned in the longitudinal direction (parallel to the columns), the two proximity sensors may be separated by a distance equivalent to a length of at least one key in the longitudinal direction. For two proximity sensors aligned in the width direction (parallel to the rows), the two proximity sensors may be separated by a distance equivalent to a length of at least one key in the width direction. For two proximity sensors aligned diagonally relative to the rows and columns of the keys, the two proximity sensors may be separated by a distance equivalent to a diagonal length of at least one key.

Alternatively, a distance equivalent to at least one key may mean a distance between central points of two keys adjacent in the longitudinal direction or the width direction. The above may be applicable in a situation where it is difficult to specify size of one key.

Each proximity sensor being adjacent to at least one key may mean the proximity sensor and the key are separated by a distance equivalent to no greater than one key. Alternatively, the distance may be no greater than the distance between central points of two adjacent keys.

Separated by a distance equivalent to no greater than one key may mean for example, for a cellular phone that is long in the longitudinal direction, if the key and the proximity sensor are aligned in the longitudinal direction, the distance may be no greater than length in the longitudinal direction of one key. Alternatively, if the key and the proximity sensor are aligned in the width direction, the distance may be no greater than length in the width direction of one key. Further alternatively, if the one key and the proximity sensor are aligned in a diagonal direction, the distance may be no greater than length in the diagonal direction of one key.

(3) In the mobile information device described above, the at least two predetermined proximity sensors may include two proximity sensors that sandwich at least one of the keys therebetween.

In the above mobile information device two proximity sensors sandwich at least one of the keys therebetween. Therefore, when the two proximity sensors both detect the proximity state, it can be judged that a body part with a relatively large surface area (for example face, chest or palm) is in proximity and covering the keys. As there is a high probability of erroneous inputs occurring in the above situation, execution of operation response processing is blocked in order to prevent erroneous inputs.

Furthermore, the two proximity sensors sandwiching at least one key therebetween ensures that the two proximity sensors are separated sufficiently. Therefore, it is unlikely that the two proximity sensors both detect the proximity state during normal operation. Through the above configuration it is possible to prevent erroneous inputs when normal operation is not being performed.

(4) In the mobile information device described above, the two proximity sensors may sandwich the at least one of the keys therebetween in a width direction of the housing in planar view.

The housing of the above mobile information device may for example be a long cuboid. The two proximity sensors are aligned in the width direction of the housing in planar view. Therefore, the mobile information device can easily detect situations where a face or a hand of the user is covering the surface in the width direction. Furthermore, the two proximity sensors sandwich at least one of the keys therebetween, and even if the two proximity sensors are adjacent to two longitudinal sides of the housing in one-to-one correspondence, separation of the two proximity sensors from one another is not excessive. Therefore, it is possible to detect to an appropriate degree, situations where there is a high probability of erroneous inputs occurring. Planar view referred to above is defined as a view of the housing from a direction perpendicular to the surface (the definition is the same for other sections). The width direction of the housing intersects with the longitudinal direction of the housing at right angles and runs along the surface.

(5) In the mobile information device described above, the two proximity sensors may be centered in a longitudinal direction of the housing in planar view.

In the mobile information device described above, centering the two proximity sensors in the longitudinal direction of the housing allows detection of situations such as where the face of the user is in proximity during a telephone call. Therefore, it is possible to prevent erroneous inputs from occurring if the face of the user contacts with the keys during the telephone call.

(6) In the mobile information device described above, the at least two predetermined proximity sensors may be one of: a first combination including two proximity sensors that sandwich at least one of the keys therebetween in the width direction of the housing in planar view; and a second combination including two proximity sensors that are (i) between a key group, formed from the keys, and one of two longitudinal sides of the housing in planar view, and (ii) aligned with one another in the longitudinal direction of the housing.

The mobile information device described above is configured with a plurality of different combinations of at least two predetermined proximity sensors for detecting the proximity state of the sensing target. Through the above configuration, it is possible to detect when the sensing target, such as the human body, is in proximity in a wide range of situations, thus allowing effective prevention of erroneous inputs. The effect of the first combination has already been explained above so is omitted here (refer to sections (3) and (4)).

Through the second combination described above it is easier to detect the proximity state of the sensing target even when the sensing target is not parallel to the surface. For example, in a situation where distance between the sensing target and the one longitudinal side is small, but distance between the sensing target and the other longitudinal side is large, the second combination is able to detect the proximity state of the sensing target, thus preventing erroneous inputs. Through the second combination, it is easier to detect when the sensing target is in proximity in situations where the sensing target is inclined, relative to the surface of the housing, about an axis in the longitudinal direction of the housing.

If the second combination further includes another proximity sensor, in addition to the two proximity sensors aligned with one another in the longitudinal direction, it is desirable that the other proximity sensor is close to the two proximity sensors in terms of the width direction of the housing. Alternatively, the second combination may include only the two proximity sensors that are aligned with one another in the longitudinal direction of the housing. The above configuration is effective at detecting situations where the sensing target is inclined, relative to the surface of the housing, about an axis in the longitudinal direction.

The surface is between the two longitudinal sides of the housing, and in most cases the two longitudinal sides of the housing are also two longitudinal sides of the surface. The surface is also between two short sides of the housing, and in most cases the two short sides of the housing are also two short sides of the surface.

For the second combination, as long as the two proximity sensors are positioned on the surface so that a relative position in the width direction of the housing is between the one longitudinal side of the housing and the key group, it is not essential that the two proximity sensors are sandwiched between the longitudinal side and the key group in the width direction of the housing.

The mobile information device described above, further to the two proximity sensors between the one longitudinal side of the housing and the key group, may also be configured with a plurality of proximity sensors disposed between the other longitudinal side of the housing and the key group, forming a third combination for the at least two predetermined proximity sensors.

The two proximity sensors being positioned between the one longitudinal side of the housing and the key group ensures that execution of operation response processing is not blocked during normal operation.

(7) In the mobile information device described above, the at least two predetermined proximity sensors may be one of: a first combination including two proximity sensors that sandwich at least one of the keys therebetween; and a second combination including two proximity sensors that are (i) between the key group, formed from the keys, and one of two short sides of the housing in planar view, and (ii) aligned with one another in the width direction of the housing.

The above mobile information device is configured with a plurality of different combinations of at least two predetermined proximity sensors for detecting the proximity state and the sensing target. Through the above configuration, it is possible to detect when the sensing target is in proximity in a wide range of situations, allowing effective prevention of erroneous inputs.

The first combination may have a configuration where the two proximity sensors sandwich the at least one of the keys therebetween in the width direction of the housing, or where the two proximity sensors sandwich the at least one of the keys therebetween in the longitudinal direction of the housing. The effect of the former of the two configurations is already explained above and therefore explanation is omitted here (refer to sections (3) and (4)).

The second combination described above is effective at detecting the proximity state of the sensing target when the sensing target is not parallel to the surface. For example, in a situation where distance between the sensing target and the one short side is small, but distance between the sensing target and the other short side is large, the second combination is able to detect the proximity state of the sensing target, thus preventing erroneous inputs. Through the second combination it is possible to detect the proximity state of the sensing target, even when the sensing target is inclined, relative to the surface of the housing, about an axis in the width direction of the housing.

If the second combination further includes another proximity sensor, in addition to the two proximity sensors aligned with one another in the width direction, it is desirable that the other proximity sensor is close to the two proximity sensors in terms of the longitudinal direction of the housing. Alternatively, the second combination may include only the two proximity sensors that are aligned with one another in the width direction of the housing.

For the second combination, so long as the two proximity sensors are positioned on the surface so that a relative position in the width direction of the housing is between the one longitudinal side of the housing and the key group, it is not essential that the two proximity sensors are sandwiched between the longitudinal side and the key group in the width direction of the housing.

The mobile information device described above, further to the two proximity sensors between the one short side of the housing and the key group, may also be configured with a plurality of proximity sensors disposed between the other short side of the housing and the key group, forming a third combination for the at least two predetermined proximity sensors.

The two proximity sensors being positioned between the one short side of the housing and the key group ensures that execution of operation response processing is not blocked during normal operation.

(8) In the mobile information device described above, a receiver unit, a display unit and the key group may be disposed on the surface of the housing in respective order, and the at least two predetermined proximity sensors may be between the key group and a short side closest to the key group among the two short sides of the housing.

In the mobile information device described above, the receiver is disposed on a top section of the mobile information device and the at least two predetermined proximity sensors (second combination) are disposed on a bottom section of the mobile information device, close to the short side of the bottom section. Through the configuration described above, in situations such as where the mobile information device is stored in a chest pocket and the bottom section of the mobile information device is close to the chest while the top section of the mobile information device is separated from the chest, it is possible to effectively detect when the human body is in proximity and thus prevent erroneous inputs.

(9) The mobile information device described above, the keys and the N proximity sensors may each be a capacitive touch sensor.

In the mobile information device described above, by configuring the proximity sensors and the keys as the same type of sensors, structure of the mobile information device is simplified. Also, due to sensing targets that can be detected by the proximity sensors and the keys being identical, erroneous inputs can be prevented effectively. The mobile information device described above (or the control unit) may further include a capacitance measuring unit configured to measure a value indicating magnitude of capacitance for each of the proximity sensors and each of the keys.

(10) In the mobile information device described above, each of the keys may be configured to detect a touch operation when the sensing target includes a human finger that is in a contact state with the key, the N proximity sensors may be configured to detect the proximity state between when the sensing target is separated by no greater than a predetermined distance, and when the sensing target is in a contact state, and the predetermined distance may be greater than 0 mm and no more than 5 mm.

In the mobile information device described above, through detection of the proximity state before the sensing target is in the contact state, it is possible for the at least two predetermined proximity sensors to detect more reliably when the sensing target is in proximity, before the sensing target contacts with any of the keys. Therefore, it is possible to prevent erroneous inputs more effectively.

The predetermined distance may be set as a value when a flat surface of the sensing target is parallel to the surface and in proximity. The sensing target may alternatively be a metal or other conducting material. Alternatively, the predetermined distance may be measured by using a palm, or other body part, to touch the proximity sensor through sheets (cloth or resin) of various thicknesses.

(11) In the mobile information device described above, each of the N proximity sensors may be longer than each of the keys in at least one of the width direction and the longitudinal direction of the housing in planar view.

In the mobile information device described above, through a configuration where the proximity sensors are longer than the keys, it is difficult for the proximity sensors to detect a finger of the user during normal operation. However, the proximity sensors can detect the sensing target if it has a large surface area, for example if the sensing target is a face of the user. During normal operation it is difficult for the at least two predetermined proximity sensors to detect the proximity state of the sensing target, therefore normal operation is not inhibited.

(12) In the mobile information device described above a receiver unit, a display unit and the keys may be disposed on the surface of the housing in respective order, the N proximity sensors may include an ear sensor, not included in the at least two predetermined sensors, that is closer to the receiver unit than to the display unit and that is configured to detect one of a proximity state or a contact state of the sensing target, at least when a human ear is included in the sensing target, and when the ear sensor detects the proximity state or the contact state of the sensing target the control unit may block the processing in response to the touch operation on the at least one of the keys.

In the mobile information device described above, through use of the ear sensor it is possible to prevent erroneous inputs occurring while the mobile information device is placed against the ear of the user during a telephone call. Therefore, through a configuration including both the ear sensor and the at least two predetermined proximity sensors, erroneous inputs can be prevented more effectively.

(13) A control method relating to the present embodiment is for controlling a mobile information device that includes: a housing; a plurality of keys disposed on one surface of the housing; a control unit configured to execute processing in response to a touch operation performed on at least one of the keys; and N proximity sensors (N≥2) disposed on the surface of the housing, and each configured to detect a proximity state of a sensing target, the control method comprising: a first step of judging whether the proximity state is detected by at least two predetermined proximity sensors among the N proximity sensors; and a second step of blocking execution of the processing in response to the touch operation performed on the at least one of the keys, when judged in the first step that the at least two predetermined proximity sensors detect the proximity state.

Through the control method described above it is possible to prevent erroneous inputs even in situations where a conventional control method for a mobile information device cannot prevent erroneous inputs.

(14) A computer program relating to the present embodiment is a computer program for executing control processing that controls a mobile information device that includes: a housing; a plurality of keys disposed on one surface of the housing; a control unit configured to execute processing in response to a touch operation performed on at least one of the keys; and N proximity sensors (N≥2) disposed on the surface of the housing, and each configured to detect a proximity state of a sensing target, the control processing comprising: a first step of judging whether the proximity state is detected by at least two predetermined proximity sensors among the N proximity sensors; and a second step of blocking execution of the processing in response to the touch operation performed on the at least one of the keys, when judged in the first step that the at least two predetermined proximity sensors detect the proximity state.

According to the computer program described above, it is possible to prevent erroneous inputs even in situations where a conventional computer program for executing control processing that controls a mobile information device cannot prevent erroneous inputs. The computer program described above may be stored on a recording medium (a non-transitory recording medium for example) for distribution or other purposes.

INDUSTRIAL APPLICABILITY

The mobile information device relating to the present invention is appropriate for use in cellular phones or similar devices including keys on which touch operations can be performed using relatively small amounts of force, or even just by contact.

REFERENCE SIGNS LIST 100, 300, 400, 500 mobile information device
101 housing
102 front surface
102a, b longitudinal side
103 receiver
104 display unit
105 key
106 operation block
110a-d proximity sensor
200 control unit
201 communication unit
203 telephone call control unit
207 capacitance measuring unit
208 measured value register
210 information processing sub-unit
211 key operation detecting sub-unit
213 erroneous input preventing sub-unit
260 finger
261, 262 electrode
280 sensing target
310 ear sensor
510a, b proximity sensor

The invention claimed is:

1. A mobile information device comprising:
a housing;
a plurality of keys disposed on one surface of the housing;
a control unit configured to execute processing in response to a touch operation performed on at least one of the keys; and
N proximity sensors (N≥2) disposed on the surface of the housing, and each configured to detect a proximity state of a sensing target,
wherein when at least two predetermined proximity sensors among the N proximity sensors detect the proximity state, the control unit blocks the processing in response to the touch operation on at least one of the keys,
wherein the at least two predetermined proximity sensors are separated from one another by a distance equivalent to at least one key, and are each adjacent to at least one of the keys, and
wherein the at least two predetermined proximity sensors include two proximity sensors that sandwich at least one of the keys therebetween.

2. The mobile information device in claim 1, wherein the two proximity sensors sandwich the at least one of the keys therebetween in a width direction of the housing in planar view.

3. The mobile information device in claim 2, wherein the two proximity sensors are centered in a longitudinal direction of the housing in planar view.

4. A mobile information device comprising:
a housing;
a plurality of keys disposed on one surface of the housing;
a control unit configured to execute processing in response to a touch operation performed on at least one of the keys; and
N proximity sensors (N≥2) disposed on the surface of the housing, and each configured to detect a proximity state of a sensing target,
wherein when at least two predetermined proximity sensors among the N proximity sensors detect the proximity state, the control unit blocks the processing in response to the touch operation on at least one of the keys, and wherein the at least two predetermined proximity sensors are one of a first combination including two proximity sensors that sandwich at least one of the keys therebetween in a width direction of the housing in planar view, and a second combination including two proximity sensors that are (i) between a key group, formed from the keys, and one of two longitudinal sides of the housing in planar view, and (ii) aligned with one another in a longitudinal direction of the housing.

5. A mobile information device comprising:

a housing;

a plurality of keys disposed on one surface of the housing;

a control unit configured to execute processing in response to a touch operation performed on at least one of the keys; and N proximity sensors (N≥2) disposed on the surface of the housing, and each configured to detect a proximity state of a sensing target, wherein when at least two predetermined proximity sensors among the N proximity sensors detect the proximity state, the control unit blocks the processing in response to the touch operation on at least one of the keys, and wherein the at least two predetermined proximity sensors are one of a first combination including two proximity sensors that sandwich at least one of the keys therebetween, and a second combination including two proximity sensors that are (i) between a key group, formed from the keys, and one of two short sides of the housing in planar view, and (ii) aligned with one another in a width direction of the housing.

6. The mobile information device in claim 5, wherein a receiver unit, a display unit and the key group are disposed on the surface of the housing in respective order, and the at least two predetermined proximity sensors are between the key group and a short side closest to the key group among the two short sides of the housing.

7. A mobile information device comprising:

a housing;

a plurality of keys disposed on one surface of the housing;

a control unit configured to execute processing in response to a touch operation performed on at least one of the keys; and N proximity sensors (N≥2) disposed on the surface of the housing, and each configured to detect a proximity state of a sensing target, wherein when at least two predetermined proximity sensors among the N proximity sensors detect the proximity state, the control unit blocks the processing in response to the touch operation on at least one of the keys, and wherein each of the keys is configured to detect a touch operation when the sensing target includes a human finger that is in a contact state with the key, the N proximity sensors are configured to detect the proximity state between when the sensing target is separated by no greater than a predetermined distance, and when the sensing target is in a contact state, and the predetermined distance is greater than 0 mm and no more than 5 mm.

8. The mobile information device in claim 7, wherein each of the N proximity sensors is longer than each of the keys in at least one of a width direction and a longitudinal direction of the housing in planar view.

9. The mobile information device in claim 7, wherein the keys and the N proximity sensors are each a capacitive touch sensor.

10. A mobile information device comprising:

a housing;

a plurality of keys disposed on one surface of the housing;

a control unit configured to execute processing in response to a touch operation performed on at least one of the keys; and N proximity sensors (N≥2) disposed on the surface of the housing, and each configured to detect a proximity state of a sensing target, wherein when at least two predetermined proximity sensors among the N proximity sensors detect the proximity state, the control unit blocks the processing in response to the touch operation on at least one of the keys, and wherein a receiver unit, a display unit and the keys are disposed on the surface of the housing in respective order, the N proximity sensors include an ear sensor, not included in the at least two predetermined sensors, that is closer to the receiver unit than to the display unit and that is configured to detect one of a proximity state or a contact state of the sensing target, at least when a human ear is included in the sensing target, and when the ear sensor detects the proximity state or the contact state of the sensing target the control unit blocks the processing in response to the touch operation on the at least one of the keys.

* * * * *